(12) United States Patent
Walia et al.

(10) Patent No.: US 10,653,225 B2
(45) Date of Patent: May 19, 2020

(54) APPARATUS FOR APPLYING COATING TO NAILS

(71) Applicant: PREEMADONNA INC., Menlo Park, CA (US)

(72) Inventors: Herpreet Singh Walia, Menlo, CA (US); Casey Kute Schulz, San Jose, CA (US); Deepak Boggavarapu, San Carlos, CA (US); Janet Peterson, Larkspur, CA (US); Peter Peterson, Larkspur, CA (US)

(73) Assignee: PREEMADONNA INC., Sunnyvale, CA (US)

( * ) Notice: Subject to any disclaimer, the term of this patent is extended or adjusted under 35 U.S.C. 154(b) by 533 days.

(21) Appl. No.: 15/328,039

(22) PCT Filed: Apr. 27, 2015

(86) PCT No.: PCT/US2015/027851
§ 371 (c)(1),
(2) Date: Jan. 22, 2017

(87) PCT Pub. No.: WO2016/014132
PCT Pub. Date: Jan. 28, 2016

(65) Prior Publication Data
US 2017/0215550 A1 Aug. 3, 2017

Related U.S. Application Data

(63) Continuation of application No. 14/468,239, filed on Aug. 25, 2014, now Pat. No. 9,687,059.
(Continued)

(51) Int. Cl.
G06K 15/22 (2006.01)
A45D 29/22 (2006.01)
(Continued)

(52) U.S. Cl.
CPC ............ A45D 29/22 (2013.01); A45D 29/00 (2013.01); A45D 34/042 (2013.01);
(Continued)

(58) Field of Classification Search
None
See application file for complete search history.

(56) References Cited

U.S. PATENT DOCUMENTS 3,130,734 A  4/1964  Ellis et al.
D277,323 S   1/1985  Raicevic
(Continued)

FOREIGN PATENT DOCUMENTS

AU  2014304383  11/2015
CA     2911150   2/2015
(Continued)

OTHER PUBLICATIONS

U.S. Appl. No. 61/869,611, filed Aug. 23, 2013, Nail Painting Robot.
(Continued)

Primary Examiner — Ted W Barnes
(74) Attorney, Agent, or Firm — London Bridge Ventures

(57) ABSTRACT

A system that can paint a user's nail. The system can utilize a user's smartphone and use the touch screen and camera to detect the position of the user's nail. The device can move an applicator to an appropriate position or instruct the user to move their finger relative to the applicator to paint the nail.

21 Claims, 19 Drawing Sheets

Related U.S. Application Data

(60) Provisional application No. 62/028,233, filed on Jul. 23, 2014, provisional application No. 61/869,611, filed on Aug. 23, 2013.

(51) Int. Cl.

| | | |
|---|---|---|
| *A45D 29/00* | (2006.01) | |
| *A45D 44/00* | (2006.01) | |
| *G06T 7/13* | (2017.01) | |
| *B41J 3/407* | (2006.01) | |
| *A45D 34/04* | (2006.01) | |
| *G06T 7/20* | (2017.01) | |
| *G06T 7/70* | (2017.01) | |

(52) U.S. Cl.
CPC ............ *A45D 44/005* (2013.01); *B41J 3/407* (2013.01); *B41J 3/4073* (2013.01); *G06T 7/13* (2017.01); *G06T 7/20* (2013.01); *G06T 7/70* (2017.01); *A45D 2029/005* (2013.01); *A45D 2044/007* (2013.01); *G06T 2207/30196* (2013.01)

(56) References Cited

U.S. PATENT DOCUMENTS

| | | | |
|---|---|---|---|
| D299,559 S | 1/1989 | Wong | |
| 4,864,966 A * | 9/1989 | Anderson | B05B 12/14 427/265 |
| 4,910,661 A | 3/1990 | Barth et al. | |
| 5,668,930 A | 9/1997 | Hamura et al. | |
| 5,931,166 A * | 8/1999 | Weber | A45D 29/00 132/73 |
| 6,035,860 A * | 3/2000 | Mombourquette | A45D 29/00 132/200 |
| 6,067,996 A | 5/2000 | Pearl | |
| 6,286,517 B1 * | 9/2001 | Weber | A45D 29/00 132/200 |
| 6,336,694 B1 * | 1/2002 | Ishizaka | A45D 29/00 347/105 |
| 6,525,724 B1 * | 2/2003 | Takami | A45D 29/00 345/418 |
| 6,585,342 B1 | 7/2003 | Mantell | |
| D686,369 S | 7/2013 | Horvath | |
| D705,488 S | 5/2014 | Cheng | |
| 9,357,825 B2 * | 6/2016 | Yamasaki | A45D 29/00 |
| 1,478,201 A1 | 10/2016 | Legallais | |
| 9,462,869 B2 * | 10/2016 | Bitoh | A45D 29/00 |
| 9,475,308 B2 * | 10/2016 | Legallais | B41J 29/38 |
| 9,486,050 B2 * | 11/2016 | Yamasaki | A45D 29/00 |
| 9,510,658 B2 * | 12/2016 | Nagao | A45D 29/00 |
| 9,526,313 B2 * | 12/2016 | Asako | A45D 29/00 |
| 9,603,431 B2 * | 3/2017 | Nagao | A45D 29/00 |
| 9,635,923 B2 * | 5/2017 | Bitoh | A45D 29/00 |
| 9,642,436 B2 * | 5/2017 | Miyamoto | B41J 3/407 |
| 9,675,159 B2 * | 6/2017 | Bitoh | A45D 29/00 |
| 9,712,727 B2 * | 7/2017 | Yamasaki | H04N 5/225 |
| 9,743,740 B2 * | 8/2017 | Teshima | A45D 29/00 |
| 9,799,116 B2 * | 10/2017 | Kafuku | G06T 7/73 |
| 9,808,068 B2 * | 11/2017 | Yamasaki | A45D 29/00 |
| 9,820,547 B2 * | 11/2017 | Yamasaki | A45D 44/005 |
| 9,888,759 B2 * | 2/2018 | Asako | A45D 34/041 |
| 9,889,692 B2 * | 2/2018 | Legallais | B41J 29/38 |
| 9,894,976 B2 * | 2/2018 | Shimizu | G06K 15/021 |
| 9,894,978 B2 * | 2/2018 | Nagao | G06T 7/0002 |
| 9,901,156 B2 * | 2/2018 | Nagao | A45D 29/00 |
| 9,930,951 B2 * | 4/2018 | Nagao | A45D 34/04 |
| 9,943,154 B2 * | 4/2018 | Teshima | B41J 3/407 |
| 9,943,155 B2 * | 4/2018 | Hori | B41J 3/407 |
| 9,955,764 B2 * | 5/2018 | Yoshigai | A45D 29/22 |
| 10,022,984 B2 * | 7/2018 | Irie | B41J 3/4073 |
| 10,029,477 B2 * | 7/2018 | Yamasaki | B41J 3/407 |
| 10,130,154 B2 * | 11/2018 | Irie | A45D 29/00 |
| 10,149,526 B2 * | 12/2018 | Nagao | G06K 9/00375 |
| 10,278,472 B2 * | 5/2019 | Yamasaki | A45D 29/22 |
| 10,292,475 B2 * | 5/2019 | Yamasaki | A45D 29/00 |
| 10,404,890 B2 * | 9/2019 | Cao | G06F 30/00 |
| 2003/0041871 A1 | 3/2003 | Endo | |
| 2003/0217758 A1 | 11/2003 | Mesirow | |
| 2004/0094176 A1 | 5/2004 | Daoting | |
| 2005/0041018 A1 | 2/2005 | Philipp | |
| 2005/0150508 A1 | 7/2005 | Downs | |
| 2006/0044345 A1 | 3/2006 | Jones | |
| 2006/0087686 A1 | 4/2006 | Anderson | |
| 2007/0050207 A1 | 3/2007 | Merszei | |
| 2007/0092634 A1 * | 4/2007 | Zhang | A45D 29/00 427/1 |
| 2010/0123756 A1 * | 5/2010 | Yamada | B41J 2/185 347/36 |
| 2011/0228289 A1 * | 9/2011 | Yamamoto | B41J 11/002 358/1.8 |
| 2012/0048880 A1 | 3/2012 | Damolaris | |
| 2012/0066079 A1 | 3/2012 | Falzone | |
| 2012/0103210 A1 * | 5/2012 | Hashimoto | B41J 3/407 101/35 |
| 2012/0147113 A1 * | 6/2012 | Yamasaki | A45D 29/00 347/104 |
| 2012/0287183 A1 * | 11/2012 | Bitoh | A45D 29/00 347/3 |
| 2012/0287192 A1 | 11/2012 | Yamasaki | |
| 2013/0019799 A1 * | 1/2013 | Bitoh | B41J 3/407 118/300 |
| 2013/0038647 A1 | 2/2013 | Hashimoto | |
| 2013/0038648 A1 * | 2/2013 | Kasahara | B41J 3/407 347/2 |
| 2013/0083098 A1 | 4/2013 | Yamasaki | |
| 2013/0106970 A1 * | 5/2013 | Yamasaki | B41J 3/407 347/110 |
| 2013/0216295 A1 | 8/2013 | Wong | |
| 2013/0235137 A1 * | 9/2013 | Nakayama | A45D 29/00 347/102 |
| 2013/0274907 A1 | 10/2013 | Carbonera et al. | |
| 2014/0060560 A1 | 3/2014 | Bitoh et al. | |
| 2014/0132968 A1 | 5/2014 | Bitoh et al. | |
| 2014/0161507 A1 | 6/2014 | Wong | |
| 2015/0062216 A1 * | 3/2015 | Yamasaki | B41J 3/4073 347/9 |
| 2015/0138385 A1 | 5/2015 | Kim | |
| 2015/0182001 A1 * | 7/2015 | Yi | A45D 29/00 132/200 |
| 2015/0335131 A1 * | 11/2015 | Ortiz | A45D 29/00 132/73.6 |
| 2016/0183657 A1 * | 6/2016 | Nagao | G06K 9/00375 132/200 |
| 2016/0345708 A1 * | 12/2016 | Walia | A45D 29/00 |
| 2016/0353859 A1 * | 12/2016 | Melul | A45D 34/042 |
| 2017/0036456 A1 * | 2/2017 | Legallais | B41J 29/393 |
| 2017/0072702 A1 | 3/2017 | Collett | |
| 2017/0215550 A1 | 8/2017 | Walla et al. | |
| 2017/0347770 A1 | 12/2017 | Walla et al. | |
| 2018/0255902 A1 | 9/2018 | Walla et al. | |
| 2018/0255903 A1 | 9/2018 | Walla et al. | |

FOREIGN PATENT DOCUMENTS

| | | |
|---|---|---|
| CA | 2955640 | 1/2016 |
| CA | 2955640 | 2/2017 |
| CN | 102555529 | 7/2012 |
| CN | 102886983 | 1/2013 |
| CN | 102922880 | 2/2013 |
| CN | 102948994 | 3/2013 |
| CN | 102555529 | 10/2014 |
| CN | 102886983 | 12/2014 |
| CN | 201480021791.4 | 1/2016 |
| CN | 106998870 | 8/2017 |
| EP | 1204340 | 5/2002 |
| EP | 1204340 | 3/2005 |
| EP | 2740386 | 6/2014 |
| EP | 2991832 | 3/2016 |
| EP | 2014741930 | 3/2016 |
| EP | 3179880 | 6/2017 |
| EP | 3222432 | 9/2017 |

(56) References Cited

FOREIGN PATENT DOCUMENTS

| | | | |
|---|---|---|---|
| GB | 2546672 | 7/2017 | |
| HK | 1240044 A | 5/2018 | |
| JP | 2000006384 A * | 1/2000 | ............ A45D 29/00 |
| JP | 2002165632 | 6/2002 | |
| JP | 2003-534083 A | 11/2003 | |
| JP | 2002165632 | 1/2004 | |
| JP | 2012085944 | 5/2012 | |
| JP | 2012085944 A * | 5/2012 | |
| JP | 2013039169 | 2/2013 | |
| JP | 2013142881 | 7/2013 | |
| JP | 2013192681 | 9/2013 | |
| JP | 201464892 | 4/2014 | |
| JP | 2014113445 | 6/2014 | |
| JP | 2014171699 | 9/2014 | |
| JP | 2016532710 | 9/2016 | |
| JP | 2017-521225 | 8/2017 | |
| JP | 2017521225 | 8/2017 | |
| WO | WO99/33372 | 12/1998 | |
| WO | WO0191598 | 12/2001 | |
| WO | WO 2014091411 | 6/2014 | |
| WO | WO2015018987 | 2/2015 | |
| WO | WO201501696 | 7/2015 | |
| WO | WO-2015101696 A1 * | 7/2015 | ............ B33Y 50/02 |
| WO | WO2015132734 | 9/2015 | |
| WO | WO2016014132 | 1/2016 | |

OTHER PUBLICATIONS

U.S. Appl. No. 62/028,233, filed Jul. 23, 2014, Smartphone Nail Painting Robot.
U.S. Appl. No. 14/468,239 U.S. Pat. No. 9,687,059, filed Aug. 25, 2014 Jun. 27, 2017, Nail Decorating Apparatus.
U.S. Appl. No. 15/599,503, filed May 19, 2017, Systems, Methods and Apparatuses for Decorating Nails.
U.S. Appl. No. 15/328,039, filed Jan. 22, 2017, Apparatus for Applying Coating to Nails.
U.S. Appl. No. 29/526,492, filed May 10, 2015, Nail Painting Robot.
U.S. Appl. No. 62/010,767, filed Jun. 11, 2014, Nail Painting Robot.
U.S. Appl. No. 62/041,581, filed Aug. 25, 2015, Method of Decorating Nails.
U.S. Appl. No. 62/159,855, filed May 11, 2015, Nail Decorating Apparatus.
U.S. Appl. No. 62/567,808, filed Oct. 4, 2017, Methods and Apparatuses for Automatically Painting or Decorating of Targets of Varying Surface Areas and/or Curvature Using Computer Vision and Systems Thereof for Content Management That Is Third Party Integrable.
Lee, Hanna, On My mind: It is a Social Burden?, Jun. 13, 2012, NAILS Magazine (2013).
Translation of WO2015-018987 Retrieved from patent scope.
JP Exam report JP Application No. 2017-525507 Applicant: Preemadonna Inc., dated May 8, 2019, 8 pages.
CA Exam report CA Application No. 2955640 Applicant: Preemadonna Inc., dated Feb. 20, 2019, 5 pages.
CA Exam report CA Application No. 2955640 Applicant: Preemadonna Inc., dated Apr. 30, 2019, 4 pages.
GB Exam report GB Application No. 1814292.7, Applicant: Preemadonna Inc., dated Dec. 18, 2018, 2 pages.
EPO EESR and Search Opinion EP Application No. 15824530.8, Applicant: Preemadonna Inc., dated Oct. 4, 2018, 9 pages.
International Search Report & Written Opinion for Application No. PCT/US2018/054217, Date of filing: Oct. 3, 2018, Applicant: Preemadonna Inc. dated Feb. 11, 2019, 11 pages.
GB Exam report GB Application No. 1706383.5, Applicant: Preemadonna Inc., dated Jan. 8, 2018, 4 pages.
GB Exam report GB Application No. 1706383.5, Applicant: Preemadonna Inc., dated Mar. 13, 2018, 2 pages.
GB Exam report GB Application No. 1706383.5, Applicant: Preemadonna Inc., dated Jul. 2, 2018, 3 pages.
GB Exam report GB Application No. 1706383.5, Applicant: Preemadonna Inc., dated Sep. 7, 2018, 3 pages.
GB Exam report GB Application No. 1814292.7, Applicant: Preemadonna Inc., dated Sep. 28, 2018, 2 pages.
GB Exam report GB Application No. 1814292.7, Applicant: Preemadonna Inc., dated Oct. 22, 2018, 5 pages.
GB Exam report GB Application No. 1814292.7, Applicant: Preemadonna Inc., dated Nov. 22, 2018, 4 pages.
International Search Report & Written Opinion for Application No. PCT/US2015/027851, Date of filing: Apr. 17, 2015, Applicant: Preemadonna Inc. dated Oct. 28, 2015.
Google Internet search for 'nail printing machine' date restricted prior to Apr. 26, 2014, 4 pages.
JP Final Rejection, JP Application No. 2017-525507 Applicant: Preemadonna Inc., dated Jan. 6, 2020, 4 pages.

* cited by examiner

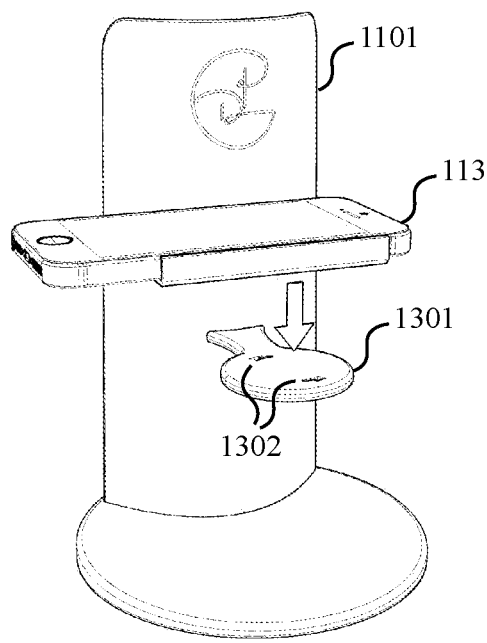
FIG. 13A
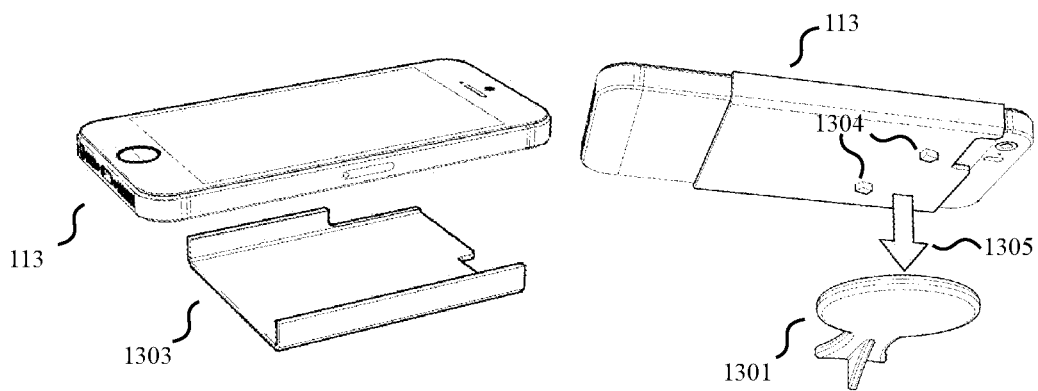
FIG. 13B
FIG. 13C

APPARATUS FOR APPLYING COATING TO NAILS

CLAIM OF PRIORITY

This application is a U.S. National Stage Filing under 35 U.S.C. 371 from International Application No. PCT/US2015/027851, filed on Apr. 27, 2015 and entitled 'APPARATUS FOR APPLYING COATING TO NAILS,', which claims the benefit of U.S. Provisional Application No. 62/028,233, entitled "SMARTPHONE NAIL PRINTING ROBOT," filed Jul. 23, 2014 and U.S. application Ser. No. 14/468,239, filed Aug. 25, 2014, entitled "NAIL DECORATING APPARATUS," which claims the benefit of U.S. Provisional Application No. 61/869,611, entitled "NAIL PAINTING ROBOT," filed Aug. 23, 2013 and U.S. Provisional Application No. 62/028,233, entitled "SMARTPHONE NAIL PRINTING ROBOT," filed Jul. 23, 2014, the contents of which are incorporated by reference in their entireties.

This application is further related to U.S. application Ser. No. 29/526,492, filed May 10, 2015, entitled 'NAIL PAINTING ROBOT', which is a Continuation Application of Internation Application No. PCT/US2015/027851, filed on Apr. 27, 2015. The contents of which are incorporated by reference in their entirety.

TECHNICAL FIELD

The present technology pertains to applying coating to nails, and more specifically pertains to utilizing an electronic apparatus to apply the coating.

BACKGROUND

Applying coatings to nails for decorative or protective purposes is an established tradition. There are many ways people currently apply coatings to their nails: they can go to a salon; do it themselves; or affix a pre-made covering to their nail. Going to a salon, however, can be inconvenient and expensive; similarly, self-application can be a hassle and have poor results while nail coverings can be expensive with varying results.

SUMMARY

A system according to this disclosure can intelligently paint a user's fingernail using various sensors and motors. A touch sensitive surface and a camera can be used to detect the position of a fingernail in order to more accurately guide an applicator to paint the surface of the nail. Motors can move the applicator relative to the nail. The user can be directed to move their fingernail relative to the applicator, with or without motors connected to the applicator. The system can incorporate many of the features of a common smartphone, handheld communications device, or any other portable electronic device, especially the touch screen and camera. Disclosed are systems, methods, and non-transitory computer-readable storage media for controlling an applicator for the coating of nails.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 13A, 13B, and 13C illustrate an example technique for connecting a portable electronic device to a stand;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a device to efficiently paint people's nails.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some instances a user can refer to a user account associated with a particular electronic device.

As used herein, the term "nail" shall be considered to refer to fingernail(s) and/or toenail(s).

As used herein, the term "digit" shall be considered to refer to a finger or a toe.

As used herein, the terms "paint," "decorate," "apply," and "print" can generally be used interchangeably to refer to affixing a coating or decorative material to a nail.

Figure 1A:
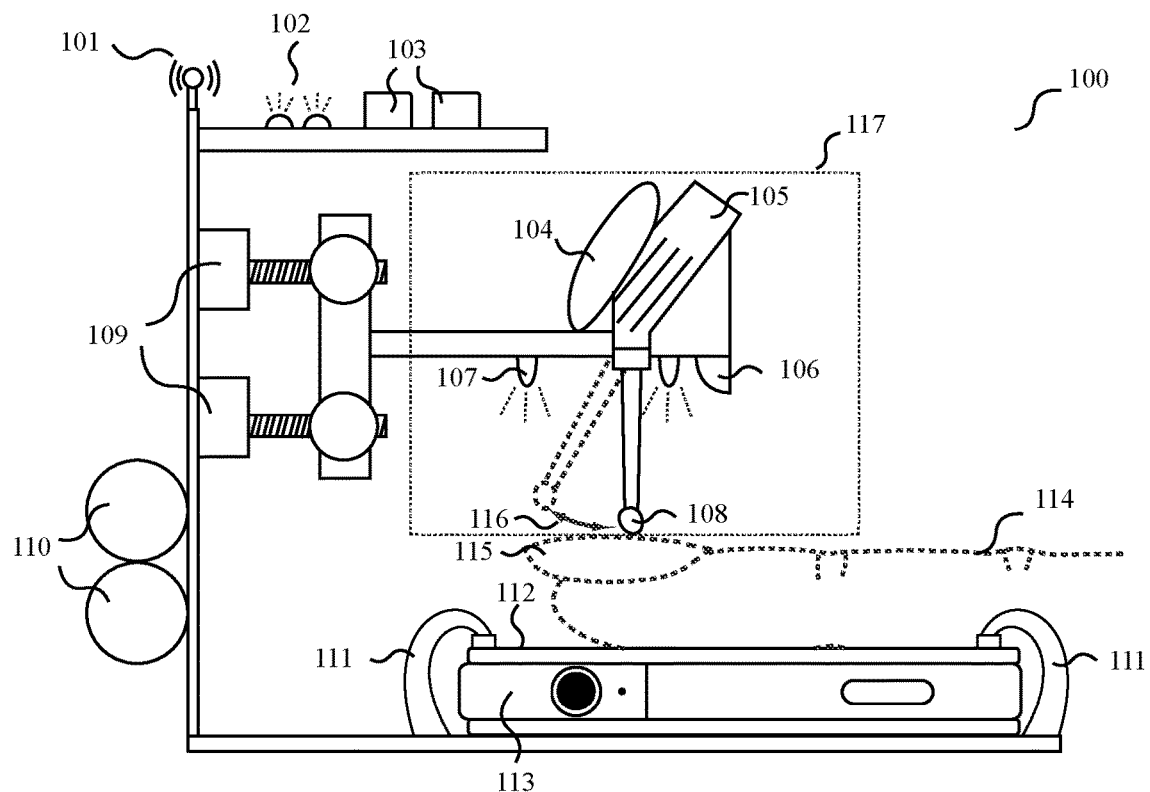
FIG. 1A illustrates an example device utilizing a smartphone in accordance with various embodiments.

FIG. 1A illustrates an example nail coating system 100 including a portable electronic device 113. The system 100 can utilize motors 109 to move an applicator assembly 117. Combining portions of the system 100 into a single form factor can result in a "nail painting robot." The applicator assembly 117 can have LEDs 107 to illuminate the surface of a nail 115 for an imaging system (camera) 106. Also on the assembly, there can be coating reservoir 105 with an attached extraction mechanism 104. The system 100 can have a communications interface 101 for any type of wired, wireless, or other connectivity. The system 100 can have interactivity with LEDs 102 and buttons 103. A power source 110 can be internal such as a battery, external such as a wall plug, or a combination of the two. In some embodiments, the power source is a connected portable electronic device 113. In some embodiments, the power source 100 can be rechargeable.

In some embodiments the system 100 is a standalone device which includes some or all of features disclosed herein. For example, the system 100 can include a touch surface 112 with integrated display, external connectivity, a camera 106, and a light source. However, it should be understood that many of these features can be found in common portable electronic devices. It can be useful for the system 100 can take advantage of the features of a connected portable electronic device already available and familiar to a user. The portable electronic device can be electronically connected to components of the system 100 through various means. The connection via the communications interface 101 can be bidirectional or unidirectional and consist of via a physical cable, NFC, RFID, Bluetooth, WiFi, infrared, visible light or any other means known to transmit data in the art. The connected portable electronic device can thus expand the functionality of the system 100.

The portable electronic device 113 can be used to detect the position of the finger 114 and nail 115 to more accurately guide the applicator 108. The portable electronic device 113 can also serve as an additional interface, displaying information and receiving input from a user.

The portable electronic device 113 can have a touch sensitive surface (touch surface) 112 that can detect the position of the finger 114 and nail 111 to more accurately guide the applicator 108 as well as receive input for the system 100. The touch surface 112 can utilize a variety of touch screen technologies known in the art to detect the position of a user's finger. The touch surface 112 may be configured to detect multiple inputs ("multi-touch") or a single input. The touch surface 112 may detect pressure and force through various means. The touch surface 112 can have gesture-recognition capabilities.

The touch surface 112 can be integrated with a display. The display can be LED, OLED, LCD, or other display technologies known in the art. The display can be monochromatic or color. The touch surface 112 can be transparent and coupled with the display thus creating a touch screen device as is known in the art. The display can thus become an interface for the system 100.

A cradle 111 is depicted in FIG. 1A as a system of mechanical armatures to hold the portable electronic device. It should be understood that any technique that prevents slippage of the device 113 can be utilized. For example, a surface with mild adhesive properties, a silicon portion, rubber pads, or small ridges that form guides to hold the edges of the device. In some embodiments, the cradle 111 can align with a part or parts of the portable electronic device 113 which can allow the system 100 to determine the relative position of the touch surface 112 to the applicator 108. In some embodiments, the cradle 111 can determine certain characteristics and/or measurements of the portable electronic device 113. This can enable the system 100 to estimate the brand and model of the portable electronic device 113. By combining measurements from the touch surface 113 with information pertaining to the touch surface 113's relative location to the portable electronic device 113 and measurements pertaining to the portable electronic device 113's relative location to the system 100, the system 100 can determine the nail's relative location to the applicator 108.

The system 100 may include a special cover or film (not shown) to apply or place upon the touch surface 112 to protect it from errant splatter from the nail coating process. This cover or film may be designed to preserve the touch surface 112 ability to detect user input. This cover or film may also be designed to be transparent thus allowing a display coupled to the touch surface 112 to be visible through the cover or film. The cover or film may use adhesive or static electricity to bind with the touch surface 112. The cover or film may also be designed to be a protective covering to prevent scratching or breakage of the touch surface 112.

The coating reservoir 105 can be refillable or consumable. The system 100 can hold multiple different coating reservoirs at the same time. In some embodiments, the coating reservoir 105 snaps into place. The coating reservoir 105 can have an authentication system to prevent the use of unlicensed reservoirs. The coating reservoir 105 can have a registration system so that the system 100 can detect and record the use of the coating reservoir 105. In some embodiments, the authentication system and registration system use the same components. The authentication/registration can be physical (e.g. a proprietary lock or special fitting) or electronic (e.g. an encrypted ID or code). In some embodiments, the coating reservoir 105 has a QR code, bar code, NFC/RFID tag, etc. that provides authentication/registration. In some embodiments, purchases of coating reservoir 105s are recorded at the point of sale and communicated to the system 100 as authorization/registration for the system 100 to accept and use the purchased coating reservoir 105.

The coating may be nail polish or ink of various types, colors, and textures. The coating may be contained in the coating reservoir 105. The coating may be a "pre-print," a "base coat," a "top coat," gel, and/or matte. Multiple coatings may be used in succession for varying effects. In some embodiments, the user is instructed to apply a coating manually. For example, the system 100 can instruct the user to apply a pre-print coat manually before using the system 100 to apply other coatings. The applicator 108 may also combine coatings to create a new coating. This can be especially useful in creating coatings of various colors, designs, and textures. The coating can also be a nail polish remover. The coating may also form a hard material when deposited on the nail. The hard material may be a plastic, resin, or ceramics similar to those used in the art of 3D-printing.

In some embodiments, the extraction mechanism 104 is a, piston, lever, or rotating cam that will apply pressure to the coating reservoir 105.

An applicator 108 can be used to apply a coating on the nail 115. The applicator 108 can have various areas of effect. For example, the applicator may apply coating to the entire nail at once, a smaller region of the nail, a narrow line, or a small point. The application zone is the area where the applicator can, as positioned, apply coating. If the applicator 108 does not apply coating to the entire nail at once, the relative location of the nail 115 to the applicator 108 can be progressively adjusted so that the applicator 108 can apply coating to every desired portion of the nail. For example, if the applicator 108 applies a line of coating at a time, the nail may move relative to the applicator 108 to achieve complete coverage. The applicator can receive an applicator control instruction effective to dispense coating from the applicator.

The applicator 108 can be a brush as depicted in FIG. 1A. The brush can be made of bristles, foam, or felt. Alternatively, the applicator 108 can have a nozzle to spray or dispense coating, an example being an inkjet head. The applicator 108 can be consumable having a limited number of uses. The applicator 108 can be easy to replace or change. The coating reservoir 105 may be external to the applicator 108 or joined with it.

The applicator 108 can be static or can be moved by a motor assembly 109. The motor assembly 109 can have at least one motor that can move the applicator 108 linearly across the nail or perpendicular to the surface of the nail. Alternatively, the motor assembly 109 can include at least one motor designed to change the direction of the applicator 108, resulting in an angular motion as illustrated in 116 in FIG. 1. It should be understood that a combination of motors providing angular and linear movement can ensure accurate and efficient nail coverage. Additionally, the motor assembly 109 can move the camera 106, applicator 108, coating reservoir 105, and light sources 107, or any combination thereof.

In some embodiments, the applicator 108 can place stickers, plastic covers, gems, or other ornamentation on the nail 115. In some embodiments, the items on the foregoing list can be created within the system 100 (e.g., the system 100 prints the sticker before placing it) as well as external to the system 100 (e.g., the system 100 can accept a cartridge of rhinestones). In some embodiments, the applicator 108 can apply a coating on a sticker which can then be applied to a nail; in other embodiments, the applicator 108 can apply a coating on a nonabsorptive surface which can then be pressed upon a nail to transfer the coating.

In some embodiments, the device uses a camera 106. The camera 106 can be any device capable of creating an image of the nail. For example, the camera 106 can be grayscale, color, infrared, etc. The camera 106 can have a high resolution or low resolution (smaller than 1 megapixel). A higher resolution can increase accuracy of analysis while a lower resolution can increase processing speed while decreasing power requirements and cost. The camera 106 can be configured to capture a sequence of images or a single still image. It can also have a fixed focal range or a variable focal range. If it has a variable focal range, it may be programmatically or manually controlled. Similarly, the camera 106's field of view may be fixed or variable with programmatic or manual controls. In some embodiments, motors are used to adjust the direction or location of the camera 106. These motors may be specific to the camera 106. Alternatively, if the camera 106 is attached to the applicator assembly 117, the motor assembly 109 can provide such functionality. In some embodiments, the camera 106 can be configured to record depth data with an image. A camera 106 thus configured can produce a three-dimensional model of a finger 114.

In some embodiments, a light source 107 is used to assist the camera 106's functionality. The light source 107 may be any type known in the art. The light 107 source can be located a distance apart from the camera 106 in order to enhance contrast in the resulting image. Higher contrast in the image can assist edge detection algorithms. Multiple light sources 107 spaced apart may be used, either simultaneously or sequentially. Because a light creates shadows from the contours of a finger, imaging techniques can use multiple images corresponding to different light sources 107 and approximate a 3D model.

In some embodiments, the system 100 contains a dryer mechanism (not pictured) to speed up the nail drying process. The dryer may utilize a UV lamp, other radiant heat sources, and/or a fan directed at the nail. Using a UV lamp can "cure" types of coatings that require curing. The dryer mechanism can be the same light source 107 used to assist the camera 106. The dryer mechanism can be detachable from the system 100.

In some embodiments, the system 100 can broadcast the nail coating session. The broadcast can include a video screen capture of the portable electronic device 113, as well as audio and images from the camera 106. The audio can come from the portable electronic device 113 or be located elsewhere in the system 100. Thus configured, the system 100 can facilitate a user to host virtual and live "nail parties" with remotely connected users. The system 100 can use video conferencing technology to output audio and/or video from the remotely connected users to the local user.

In some embodiments, the system 100 can provide users an option to purchase items. For example, the system 100 can recommend purchase of an applicator 108, coating reservoir 105, motor assembly 109, power source 110, cradles 111, dryers, etc. upon detecting that a component is ready to be replaced or an updated version is available. Purchases can be made using money (including virtual currency such as Bitcoin etc.), points (as described herein), or a combination thereof. Items for purchase can be branded items, for example they could branded according to a popular movie or musician. In some embodiments, a user can be given instructions on how to make custom parts using, for example, a 3D printer. Items external to system 100 can be purchased as well, including, stickers, cards, shirts, mugs, phone cases, headbands, pants, shoes, toothbrushes, hair dryers, sweaters, jewelry, fitness trackers, etc.

Figure 1B:
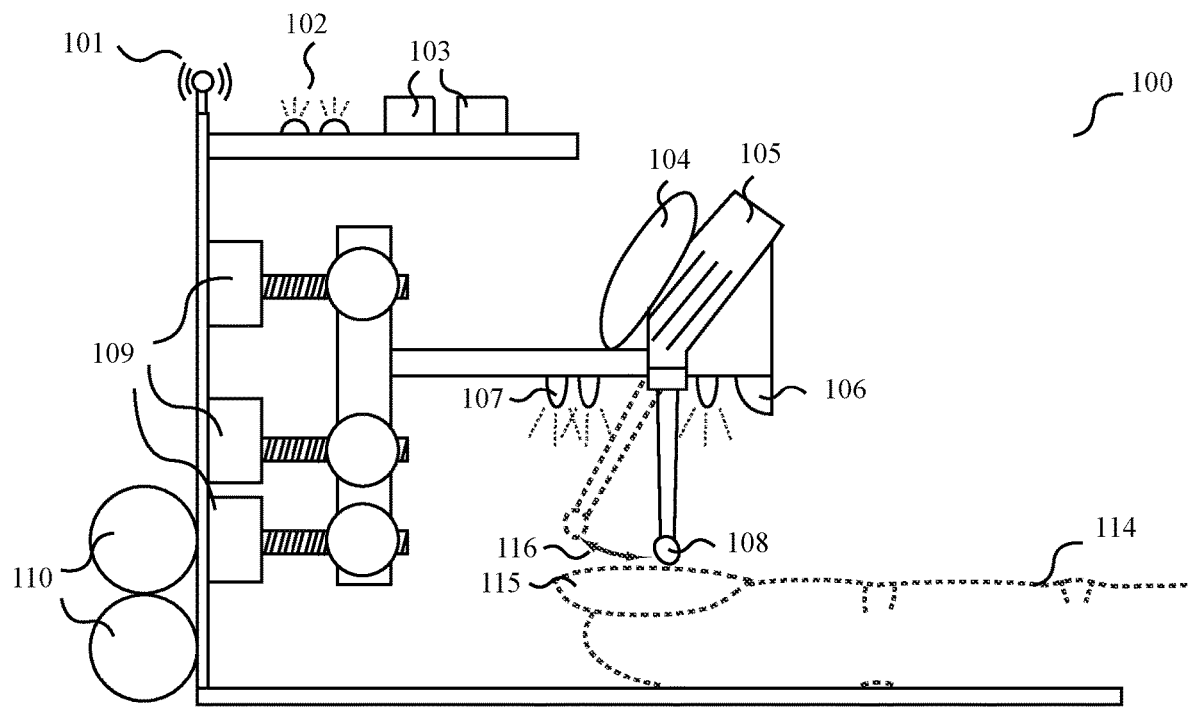
FIG. 1B illustrates an example device in accordance with various embodiments.

As illustrated in FIG. 1B, some embodiments operate without the portable electronic device 113 being physically attached to the system 100; in those embodiments, the cradle 111 can be omitted. Furthermore, some embodiments utilize three motors in the motor assembly 109. This motor assembly 109 configuration is illustrated further in FIGS. 4A, 4B, and 4C.

Figure 2:
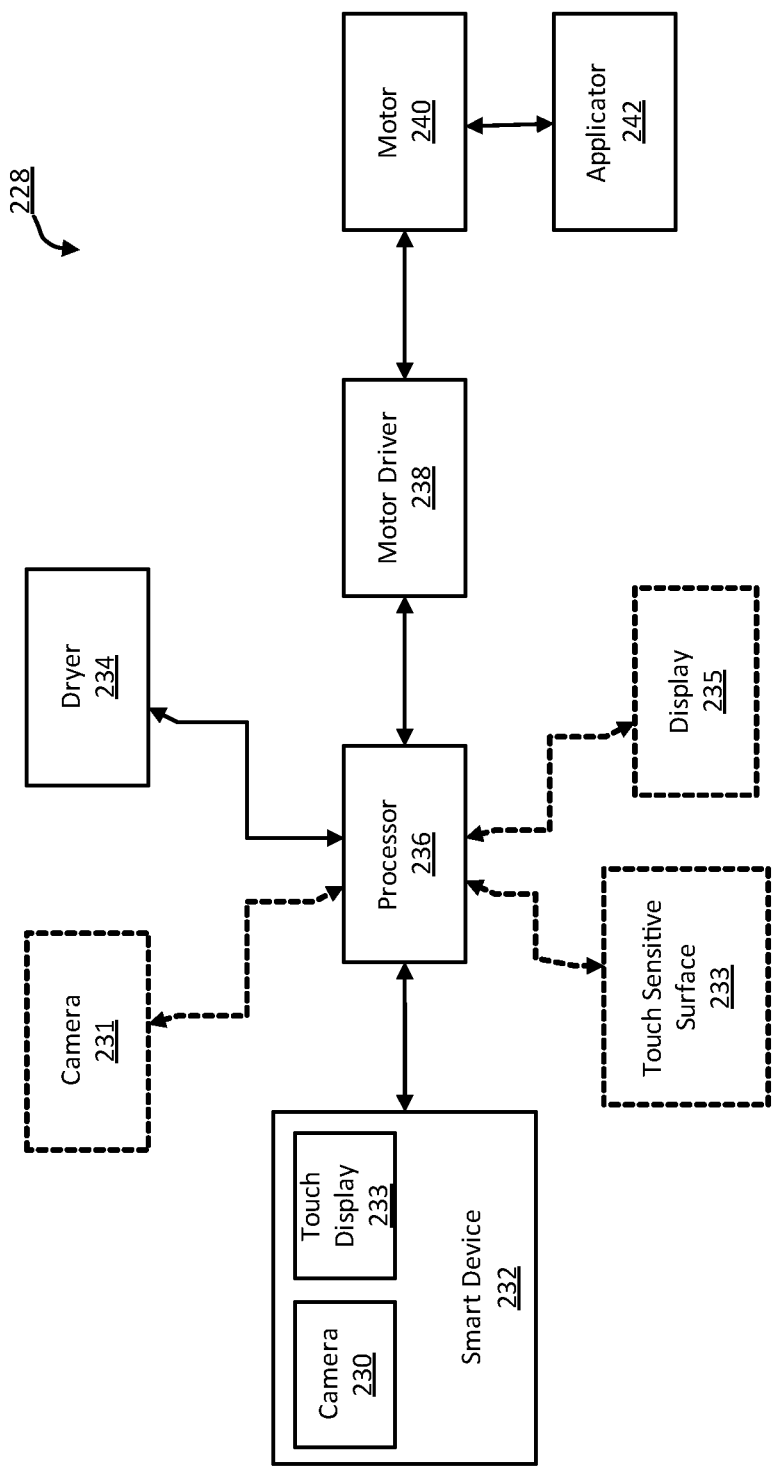
FIG. 2 illustrates an example block diagram of the example systems shown in FIGS. 1A and 1B.

FIG. 2 illustrates an example block diagram of the systems shown in FIGS. 1A and 1B. Each embodiment of system 228 can include at least a processor 236 for executing software and applications, and sending instructions to the various components of the system, and an applicator 242 for applying ink, polish, or other material to a nail. All other system components, can be included, or not, or their configuration within the system can vary depending on a specific embodiment.

In some embodiments, system 228 can make use of hardware in a smart device 232 such as a smartphone or media player, or any other device having a touch sensitive display 233 and camera 230. In such embodiments, the smart device 232 can be utilized for finger location detection, and finger boundary detection by utilizing an application stored on the smart device 232 that learns the location of a nail utilizing the touch sensitive display 233, and then can image the nail using a camera or other image detection system that is integral to the smart device. The processor 236 can communicate with the smart device 232 via a wired or wireless connection. The system 228 can also utilize the smart device for all other capabilities, including, but not limited to displays, communication, etc.

In some embodiments, the system 228 can include one or more of a camera 231, or touch sensitive surface 233, or display 235, separate from the smart device. In such embodiments, it can be possible to still utilize the smart device 232 for functions other than one or more of the camera, touch detection, or display, as described above.

In some embodiments, system 228 includes a drying unit 234, which can be connected via one way (open loop) or two way (closed loop) communications with the processor 236.

In some embodiments, the system 228 can include a motor(s) 240 and motor driver 238. These motor(s) can be used to translate the Applicator System into any orientation (XYZ or any combination or single set). The communication between the motor driver 238 and the processor 236 can be open or closed loop. The communication from the motor driver 238 to the motor(s) 240 can also be open or closed loop.

In some embodiments, system 228 can be a standalone solution. The system can include a user interface displayed on display 235, one or more cameras 231, and illumination system (LEDs, lasers, IR, etc) (not shown). In such embodiments processor 236 can communicate with smart device 230, and manage commands from the smart device 230.

In some embodiments, applicator 242 comprises an ASIC for inkjet printing. The processor 236 can communicate with the applicator 242 to eject substance, ink or polish, etc., from a nozzle.

In some embodiments, applicator 242 comprises a motor driver and one or more motors that can move one or more cams to press against a "POP" or cartridge to dispense substance, ink or polish or other, thru a nozzle, which can be a plain hole, a brush, a foam tip, etc.

In some embodiments, applicator 242 comprises a motor driver and one or more motors or solenoids. The motors or solenoids can pump a substance, from a reservoir, through a nozzle or tip. The motors or solenoids could also use compressed air to push the substance, from a reservoir, thru a nozzle or tip, etc.

Figure 3A:
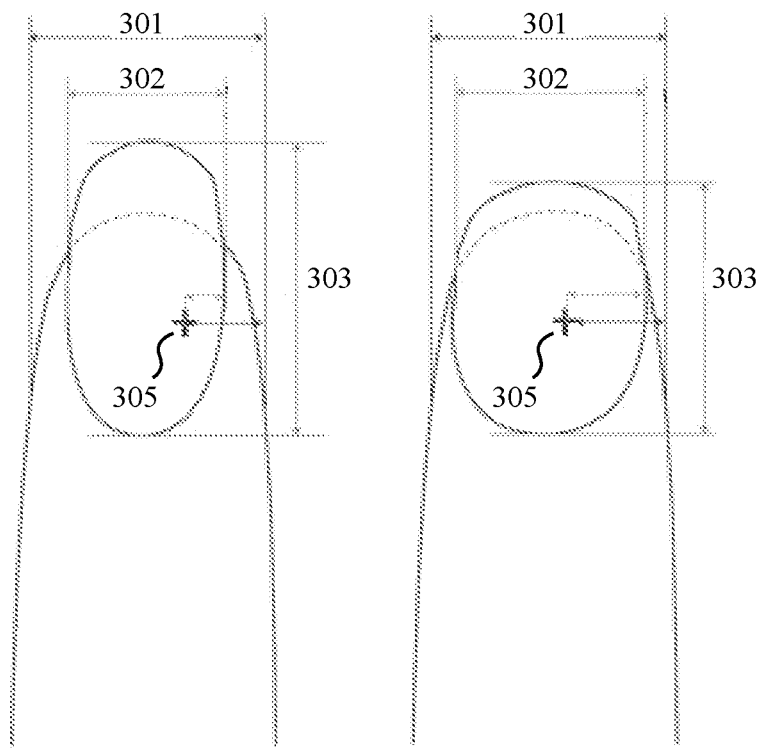
FIG. 3A illustrates various nail measurements.
Figure 3B:
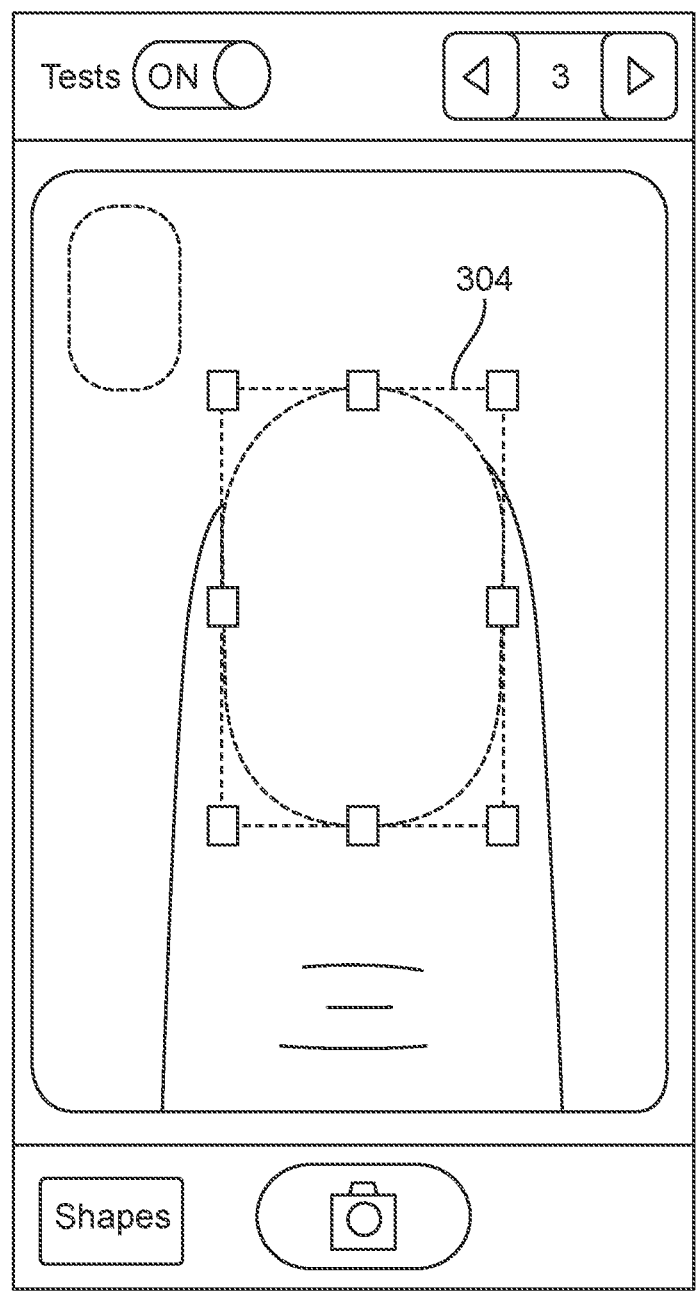
FIG. 3B illustrates an image of a user's finger and nail with the nail perimeter outlined.

FIG. 3A depicts the measurements that can be used to describe the nail and finger. The finger has a total width 301, while the nail has a width 302 and length 303. FIG. 3B depicts an example where the outline of the nail 304 is shown as an overlay on an image of the finger. The outline of the nail 304 is determined by the system 100 by analyzing the captured image of the nail from the camera. In some embodiments, the analysis is done with an edge detection algorithm. In some embodiments, the user assists the system 100 by adjusting the image or outline 304 until they match. In some embodiments, the user moves their finger until the image of the nail lines up with a static outline 304.

Typically, when a user places their finger on a touch surface 112, the touch surface reports the centroid 305 of the contact area. This centroid 305 might be in a different location for each finger, therefore the system 100 can gain greater accuracy by determining the centroid 305's position relative to the nail. Once the centroid 305's location is determined, the system 100 can, using the reading from the touch surface 112, predict the location of the nail.

Figure 4A:
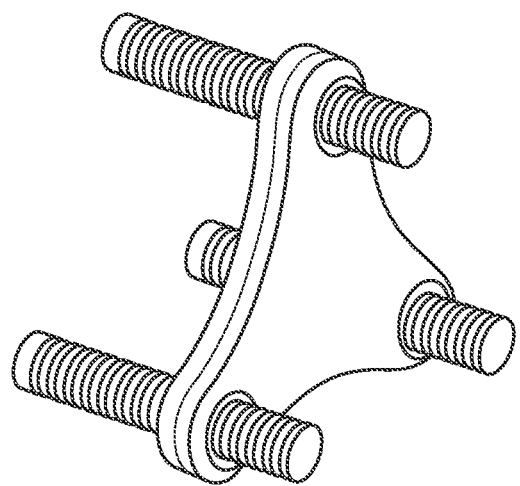
FIGS. 4A, 4B, and 4C illustrate an example motor assembly according to various embodiments.
Figure 4B:
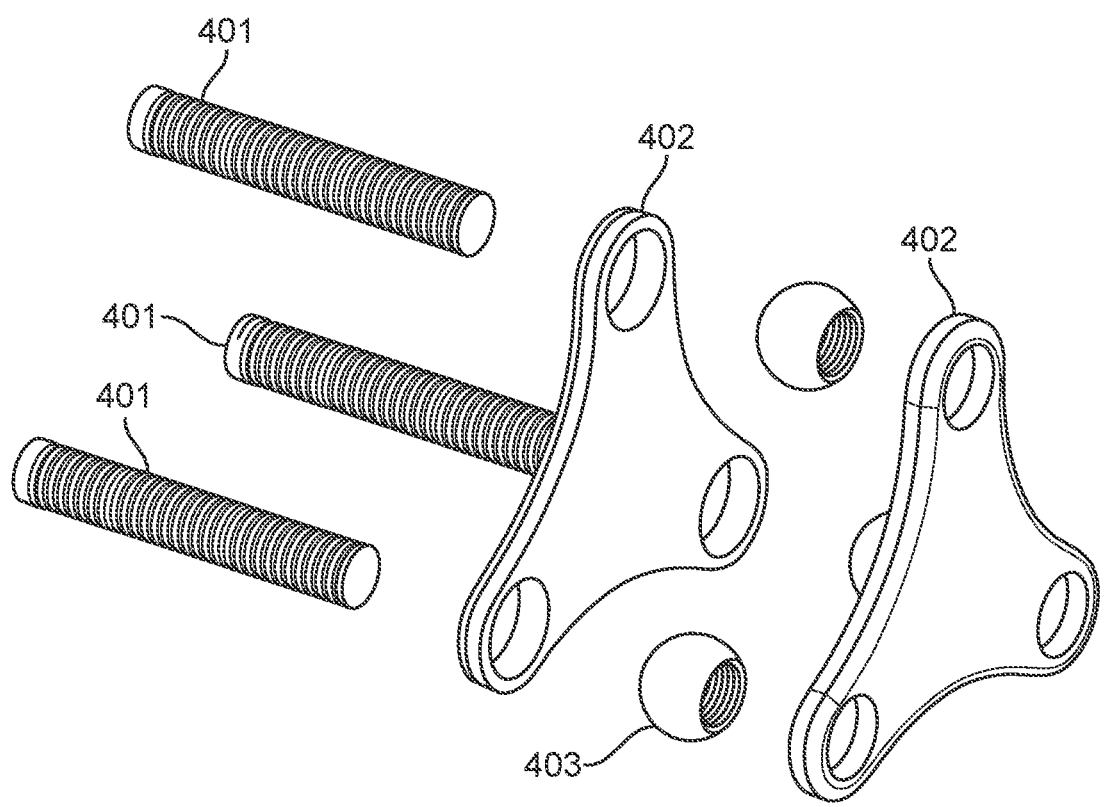
Figure 4C:
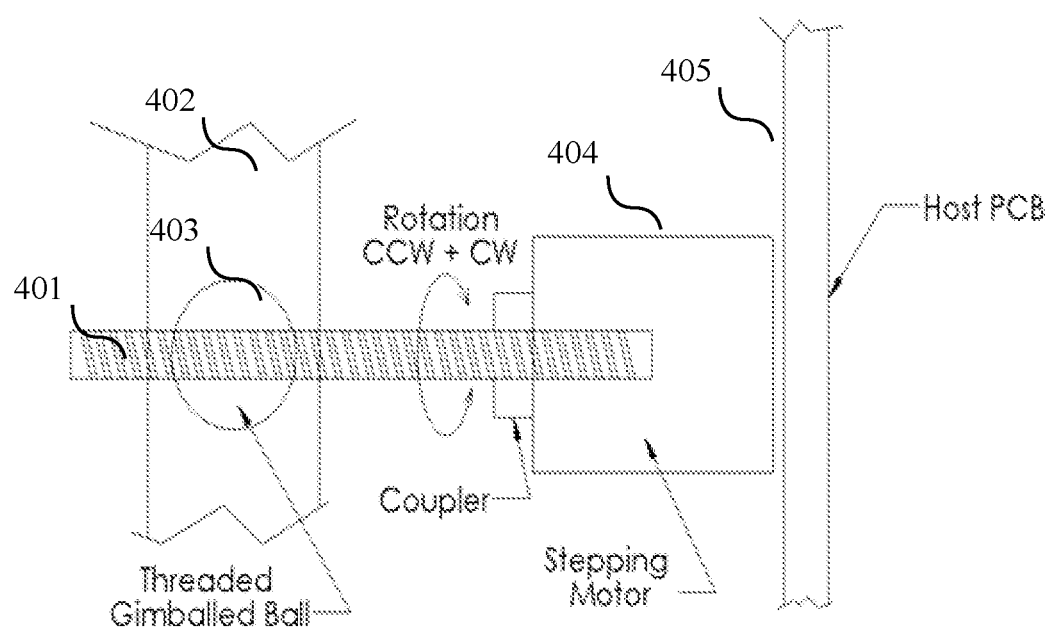

FIG. 4A depicts an example portion of the motor assembly 109. The primary purpose of the motor assembly 109 is to drive the applicator assembly 117 in the X, Y, and Z planes by rotating the threaded shafts 401. FIG. 4B depicts an exploded view of FIG. 4A. The motor assembly 117 can comprise two pliable sections 402 with holes for the threaded shafts 401. When connected, the plates 402 can form an enclosure for gimbaled and threaded nuts 403. The nuts 403 can be generally spherical and can be seated within spherical cutouts in the two pliable sections 402. There can be a notch on the nuts 403 to prevent the nuts 403 from rotating. Thus configured, rotations of the threaded shafts 401 can produce movements of the applicator assembly 117 in X, Y, and Z directions. FIG. 4C depicts a cutaway view of FIG. 4A where the threaded shafts 401 are connected to an example stepping motor 404 attached to a PCB 405. The threaded shafts 401 can be attached to stepper motors. The stepper motor 404 can rotate the threaded shaft 402 which will in turn move the associated threaded gimbaled nut 403 towards or away from the motor 404. The applicator assembly 117 can be attached to the plates 402. Although a stepper motor 404 is depicted, various types of motors or actuators can produce similar functionality.

Figure 5:
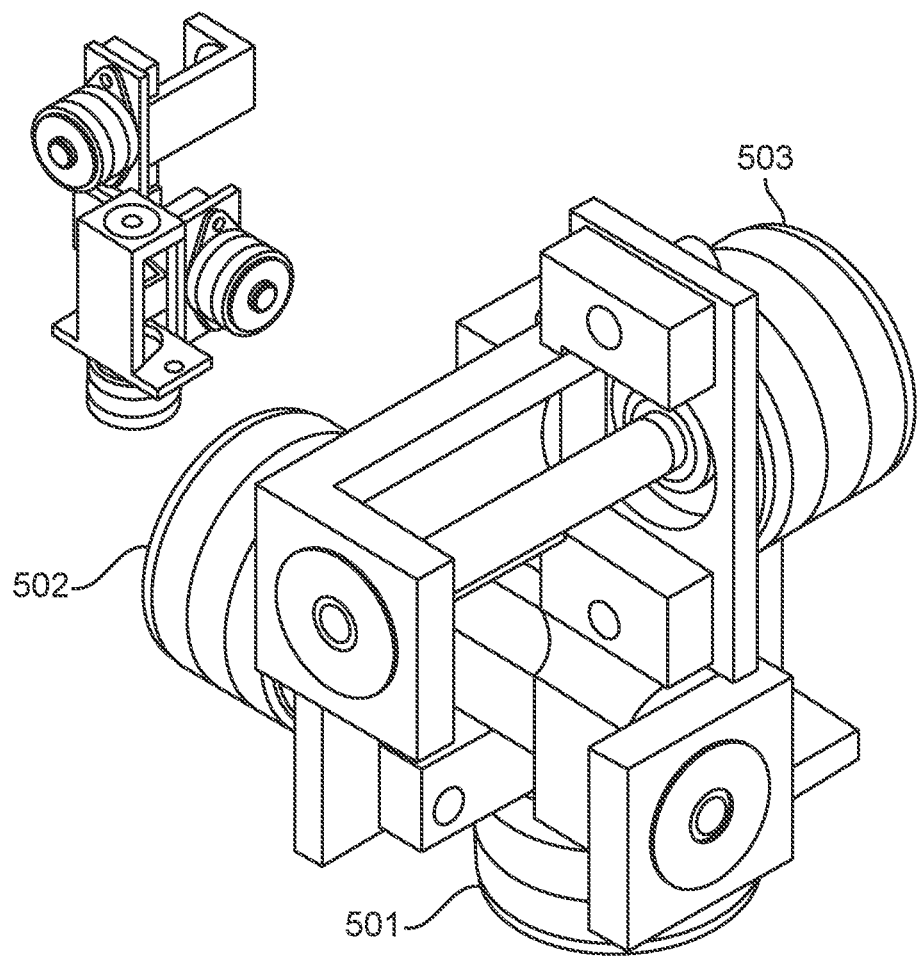
FIG. 5 illustrates an example motor assembly comprising three motors that are aligned on mutually perpendicular axes according to various embodiments.

FIG. 5 depicts an example motor assembly 109 configuration. In some embodiments, as depicted, each motor with its respective threaded shaft can be oriented along a different axis. In this configuration, a first motor 501 and shaft can be attached to a PCB or housing 405. A second motor 502 can be attached to the first motor's shaft so that the first motor 501 can move the second motor 502 along the first motor's shaft. A third motor 503 can similarly be attached to the second motor 502's shaft so that the second motor 502 can move the third motor 503 along the second motor 502's shaft. The applicator assembly 117 can then be attached to the third motor 503's shaft and similarly moved.

Figure 6D:
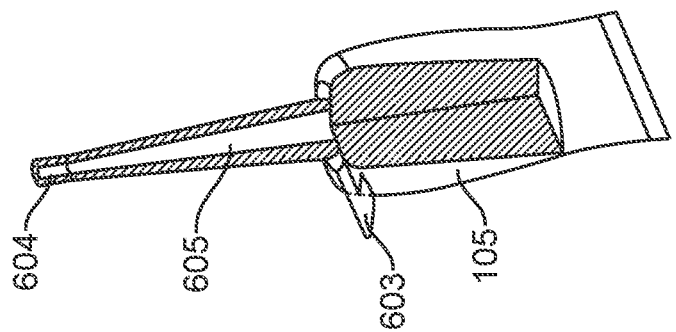
FIGS. 6A, 6B, 6C, and 6D illustrate various example applicator and coating reservoir configurations.
Figure 6C:
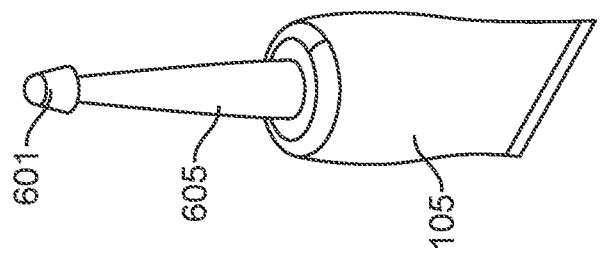
Figure 6B:
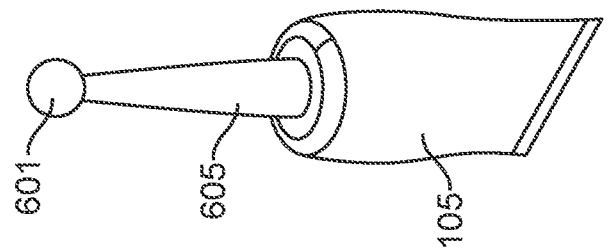
Figure 6A:
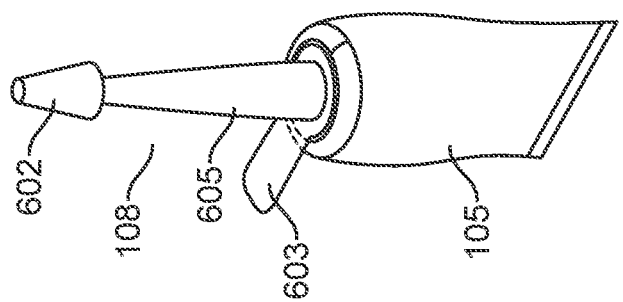

The applicator 108 can be combined with the coating reservoir 105 as exemplified in FIGS. 6A, 6B, 6C, and 6D. Various tips 601 can be at the end of a neck delivery tube 605. The tips 601 can vary in shape, for example FIG. 6B depicts a more spherical tip 601 while FIG. 6C depicts a more conical tip 601. The tips 601 can be made of different materials such as foam, felt, plastic, etc. In some embodiments, the tip is permeable and allows the coating to pass through the material; alternatively, the tip 601 can be impermeable but with an aperture through which the coating can pass. In some embodiments, the applicator 108 can have a threaded end 604 for a cap 602 and/or tips 601. Using different tips 601 can facilitate various designs, for example, a more rounded, thin tip can be used for polka dots, while a slanted tip can be used to paint the thin white lines needed for French manicures. The cap 602 can be used to seal off the coating reservoir 105 in order to prevent unwanted drying, leaking, or contamination.

In some embodiments, a cap 602 can be moved onto the applicator 108 between uses, thus preventing the coating from drying out. This can be done with or without user instruction. It should be understood that although a cap 602 is depicted, any type of resealing method or device can be used including a flap, adhesive tape, a screw (that might force an aperture to close), zipper mechanism, etc.

A removable seal 603 can be used to seal the coating reservoir 105 to prevent leakage and keep the coating from drying out during transport. When a user wishes to use the product, they can remove the seal 603 which can then allow coating to flow from the reservoir 105 to the applicator 108.

In some embodiments, the reservoir is a flexible pouch and pressure from an extraction mechanism 104 can force discharge of the coating. In other embodiments, the coating reservoir 105 is generally rigid, except for one side which can slide to decrease the volume in the coating reservoir 105.

Figure 7:
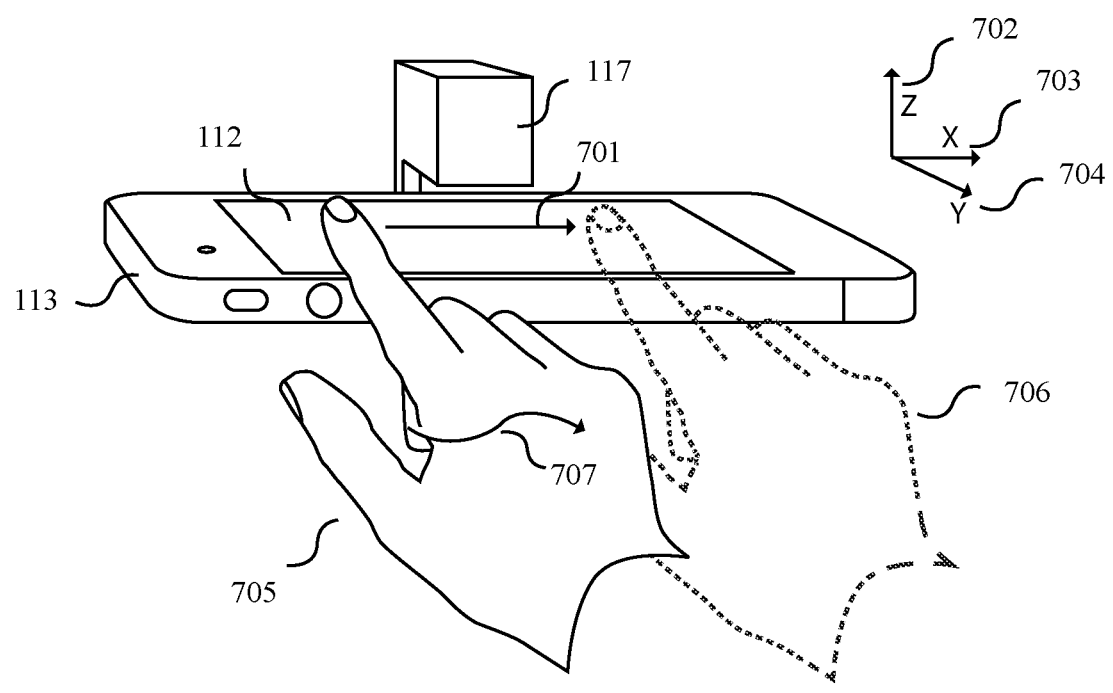
FIG. 7 illustrates an example interaction that can be utilized in various embodiments.

FIG. 7 depicts a user getting their nail coated by making a motion 701 across the surface of a touch screen 112 on the device. In some embodiments, a fixed applicator assembly 117 is used as shown. As previously explained, an applicator 108 may not have complete coverage and may require relative motion to the finger to cover the entire nail. If the applicator assembly 117 is fixed the finger can be moved 701 to achieve full coverage. In some embodiments, the system 100 can determine the delay from when an instruction to deposit coating is transmitted to when coating reaches the surface of the nail. Using such delay information combined with information pertaining to the finger's position, direction of motion, and speed, the system can determine an appropriate time to transmit the instruction to apply coating so that it hits the intended portion of the nail. The applicator assembly 117 can be connected to a portable electronic device 113. The portable electronic device 113 having a touch surface 112 with an integrated display 112 oriented along the X-Y (703-704) plane. The applicator assembly 117 can be positioned above the touch surface 112 a distance along the Z axis 702.

In some embodiments, a user can move their finger across the touch surface 112 along the X axis 703 from one position 705 to another 706 so that the finger passes under the applicator assembly 117. The touch surface 112 can detect the location of the finger as it moves and direct the applicator assembly 117 to dispense coating when the nail is in the correct placement on the touch surface 112. The touch surface 112 can detect which portion of the nail is under the applicator 108 and the applicator 108 could dispense the appropriate coating on that portion of the nail. Because the touch surface 112 might not provide the precision required for certain coatings, a camera 106 can be utilized to more accurately determine the relative position of the nail.

As an alternative to the straight motion 701, the display can direct the user to follow a non-linear travel path ("flightpath") 707 across the touch surface 112. This can enable creative designs through non-linear application. In some embodiments, a user can be instructed to practice certain flightpaths multiple times until the user's movement reaches a degree of regularity required to effectively coat the nail. In addition to location information, flightpaths can include velocity information. For example, the flightpath may require the finger to move from A to B slowly and then to C rapidly. The system 100 can record and store a custom flightpath. The system 100 can facilitate the user sharing and downloading custom flightpaths. The flightpath can be combined with audio, visual, kinesthetic, or other sensory cues to further guide a user. Flightpaths can be downloaded from third-party applications.

Figure 8:
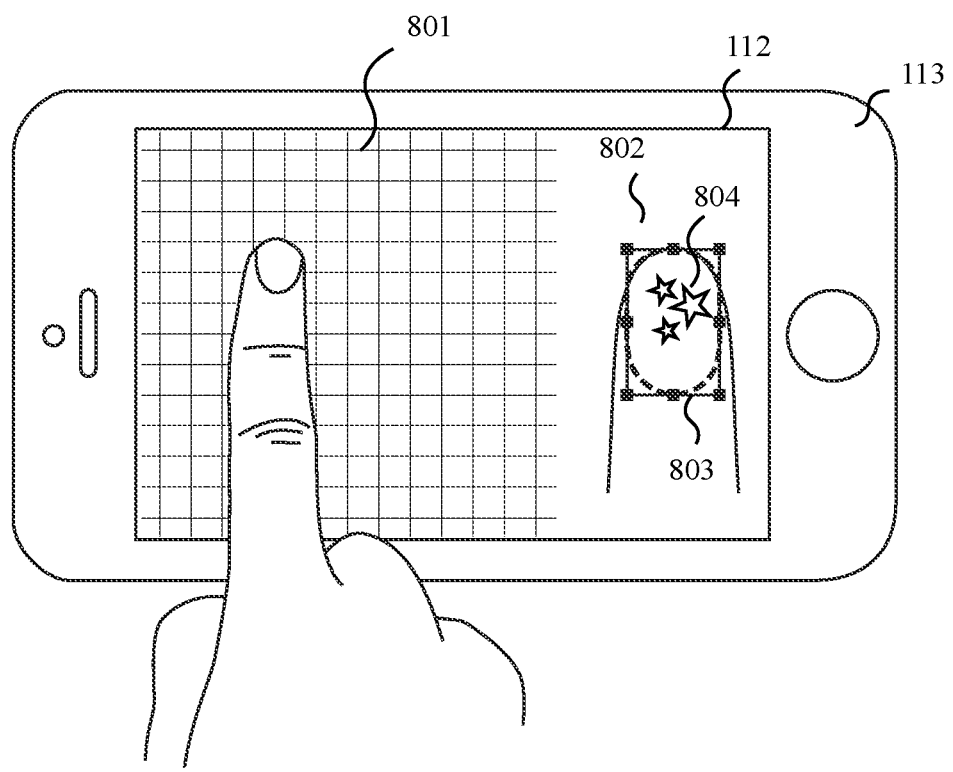
FIG. 8 illustrates an example display layout provided on a touch screen in accordance with various embodiments.

FIG. 8 depicts one example use of a touch surface 112 in combination with an embedded display. Computer vision techniques can be aided by the use of contrasting backgrounds 801. In this example embodiment, the display can show a grid background 801 which can provide contrast to the finger. The background 801 can also be a gradient, a pattern, a solid color or a video of similar properties.

In another portion of the display, information can be presented to the user 802. The display can show an image from the camera 106. The image can have an overlay showing a detected outline of the nail 803. The image can have an overlay showing the user where they should place their finger. The overlay could be an outline of a generic finger or a crosshair. The image can present a rendering or preview of what a selected coating or design may look like on the nail 804. This would facilitate a user "trying on" various designs and colors before applying them to their nail.

In some embodiments, a portion of the display can show content to entertain the user while they are getting their nails done.

Figure 9A:
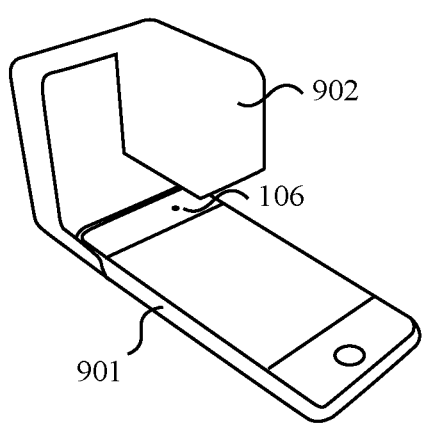
FIGS. 9A and 9B illustrate an example device utilizing a mirror assembly to reflect a camera's field of view onto a surface.
Figure 9B:
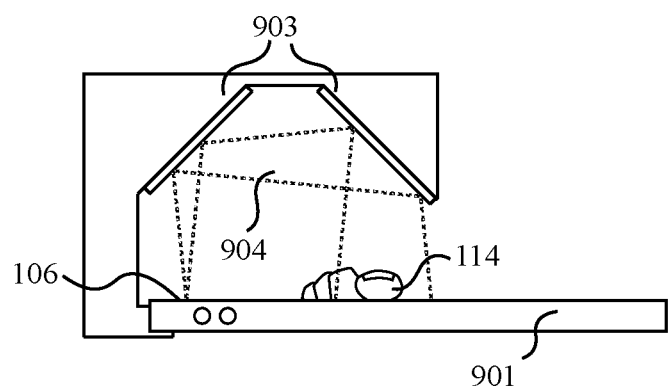

FIGS. 9A and 9B depict using a mirror assembly 902 to reflect a portable device's camera 106's field of view 904 towards the surface of the portable device 901. The mirror assembly 902 can be used combination with a portable electronic device 901 to reflect light from the touch screen of the device back to a "front-facing" camera 106 on the device. The dashed lines indicate the field of view 904 of the camera 106. Using a mirror assembly 902 enables the camera 106 to capture an image of a finger 114 placed upon the touch screen of the device. The mirror assembly may consist of one mirror or a combination of mirrors 903. The mirror assembly 902 may have at least one lens to assist with providing a desired image to the camera 106. Manual or programmatic controls may be utilized to adjust elements in the assembly. In some embodiments, the mirror assembly 902 is combined with the applicator assembly 117.

Figure 10A:
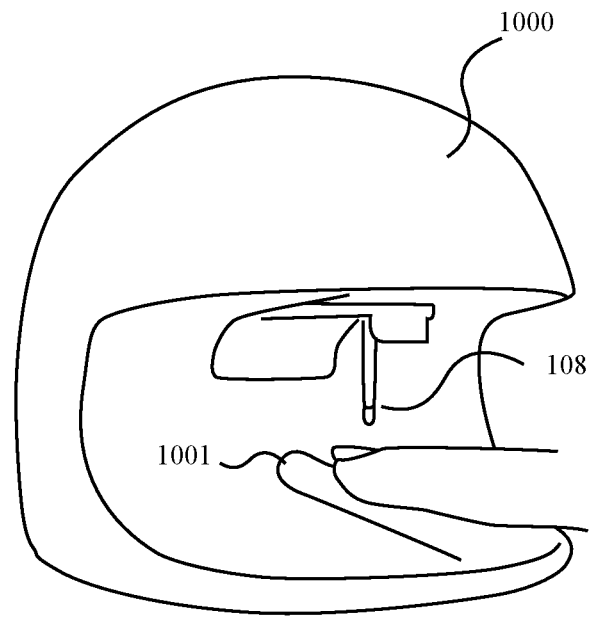
FIGS. 10A, 10B, and 10C illustrate example devices in accordance with various embodiments.

FIG. 10A shows an example embodiment 1000 where a cradle 1001 is used to hold a user's finger in place under the applicator 108. This can be an alternative to the touch surface 112 as described in other embodiments. The cradle can have a sensor to detect the presence of a finger. While the finger is in place, the applicator 108 can move to coat the surface of the nail.

Figure 10B:
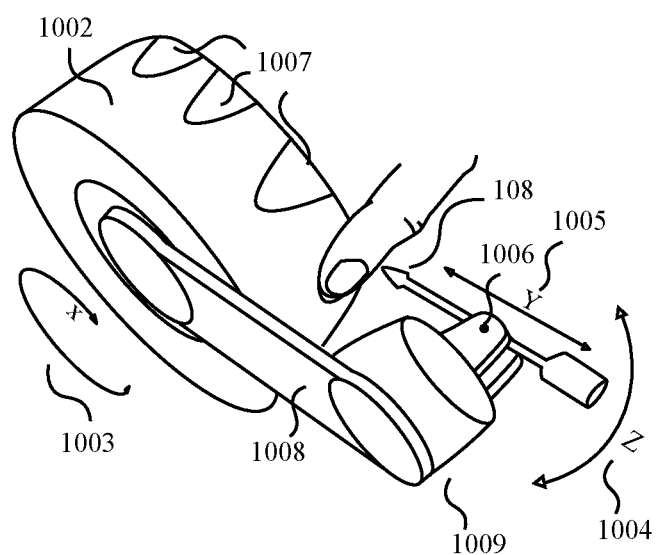

FIG. 10B shows an example embodiment emphasizing combining different techniques to move the applicator 108 relative to the nail. In some embodiments, a dial 1002 with indentations 1007 for placing fingers is attached to an armature 1008. An applicator assembly 1009 is attached to the distal end of the armature 1008. The applicator 108 can be moved linearly along the Y axis 1005, thus setting the distance of the applicator 108 above the nail. In some embodiments, the Y height 1005 can be manually adjusted. Alternatively, a motor can control the Y height 1005. The applicator 108 can be rotated about an axle 1006 corresponding to angle Z 1004. The armature 1003 can rotate relative to the dial corresponding to angle X 1003.

Figure 10C:
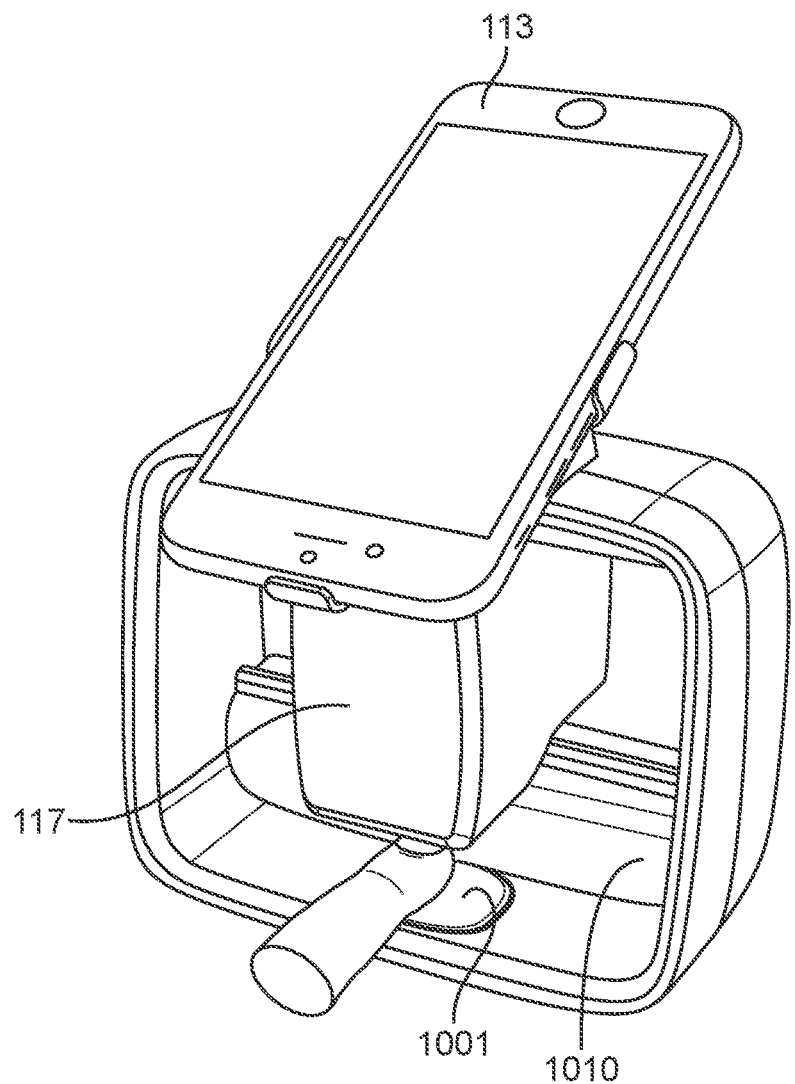

FIG. 10C shows an example embodiment similar to FIG. 10A in that a cradle 1001 to hold the finger in place is utilized. In some embodiments, the applicator assembly 117 can back and forth along a track 1010. In this example configuration, the portable electronic device 113 is used to display information to the user and receive input even though it's touch surface is not used to guide the system. The portable electronic device 113 can either be in a portrait configuration (as shown) or in a landscape configuration.

Figure 11A:
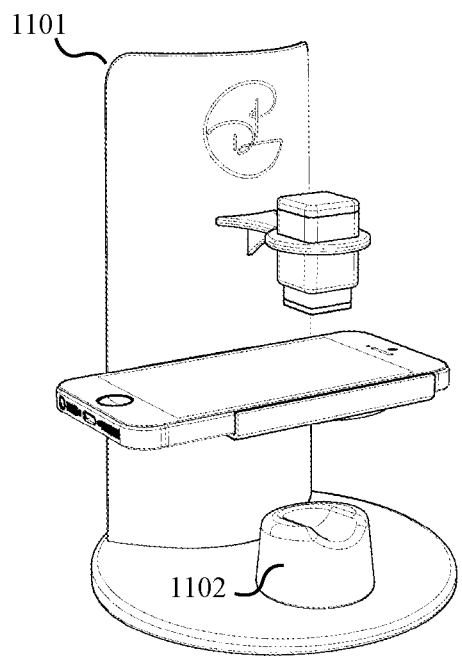
FIGS. 11A and 11B illustrate example embodiments using a stand and a finger positioning aid.
Figure 11B:
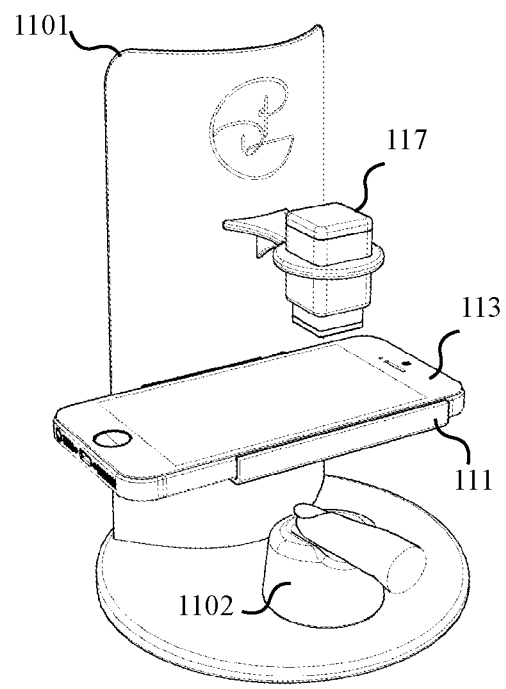

FIGS. 11A and 11B illustrate an example embodiment using a stand 1101 and a finger positioning aid 1102. Thus configured, the finger can be within the field of view of the portable electronic device 113's camera.

Figures 12A, 12B, 12C:
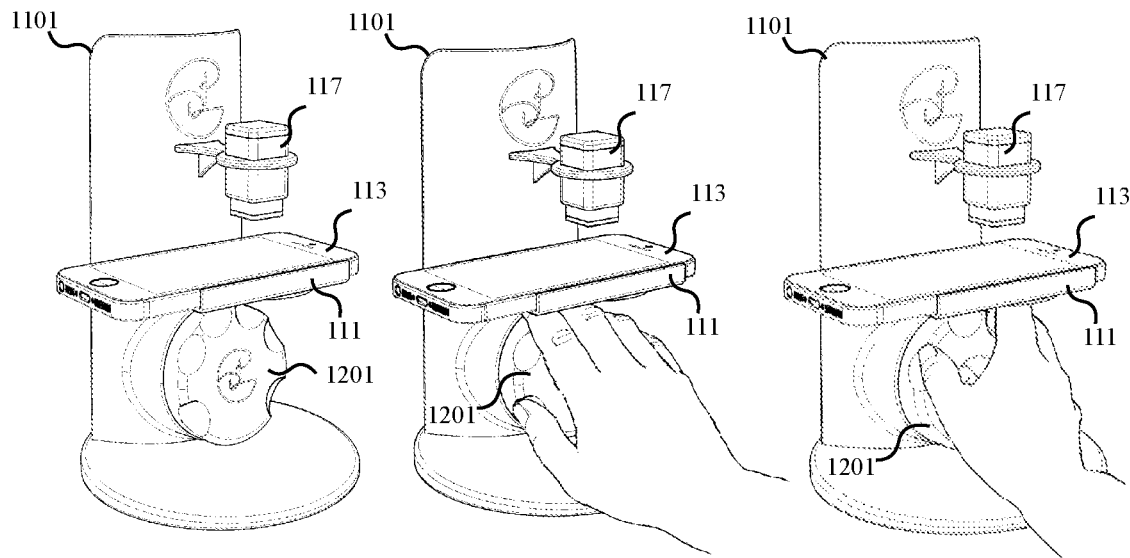
FIGS. 12A, 12B, 12C, 12D, and 12E illustrate example embodiments of the invention where a circular positioning aid is attached to a stand.
Figures 12D, 12E:
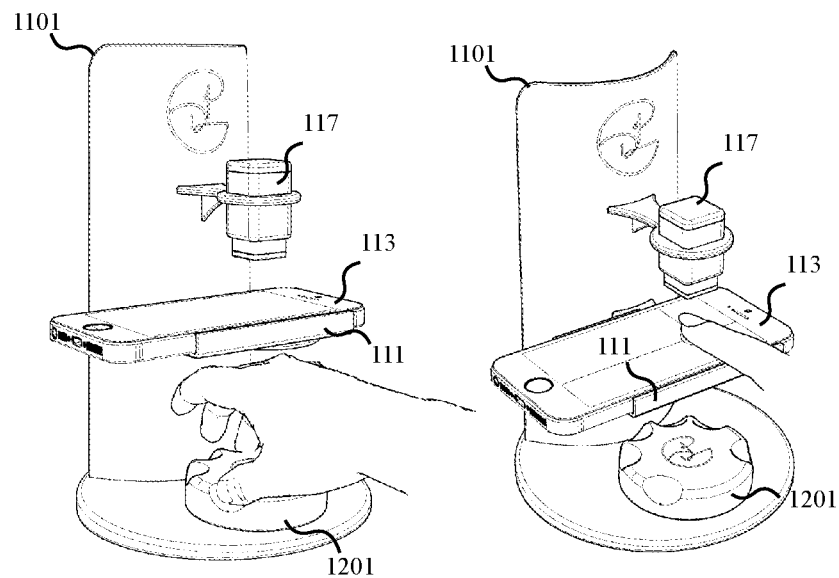

FIGS. 12A, 12B, 12C, 12D, and 12E are similar to FIGS. 11A and 11B except the positioning aid is a disk 1201 with an indention for each finger. FIG. 12A represents the disk positioning aid 1201 below the portable electronic device 113 which is connected to a base 1101 via a cradle 111. Positioned as such, the disk 1201 can be within the field of view of the portable electronic device 113's camera while the portable electronic device 113 is positioned under the applicator assembly 117. In some embodiments, the disk 1201 can rotate. For example, in FIG. 12B, the user's hand is in one position while in FIG. 12C the hand is in a different position. The disk 1201 can also be stationary. As a finger is within the field of view of the portable electronic device 113's camera, the camera can capture an image for use in image analysis techniques and visualizations described herein. While FIGS. 12A, 12B, and 12C depict the disk 1201 as parallel to vertical portion of the base 1101, the disk 1201 may also be connected so that it lies parallel to the portable electronic device as depicted in 12D and 12E.

FIGS. 13A, 13B, and 13C illustrate an example technique for connecting a portable electronic device 113 to a stand 1101. The cradle 111 featured in many embodiments can be implemented using this technique. The portable electronic device 113 can be affixed to a case 1303 with connection posts 1302 which can snap 1305 into fittings 1302 of a mount 1301 connected to a stand 1101. In some embodiments, the case 1303 can be designed to be semi-permanent, imparting protective or decorative properties to the portable electronic device 113.

Figure 14:
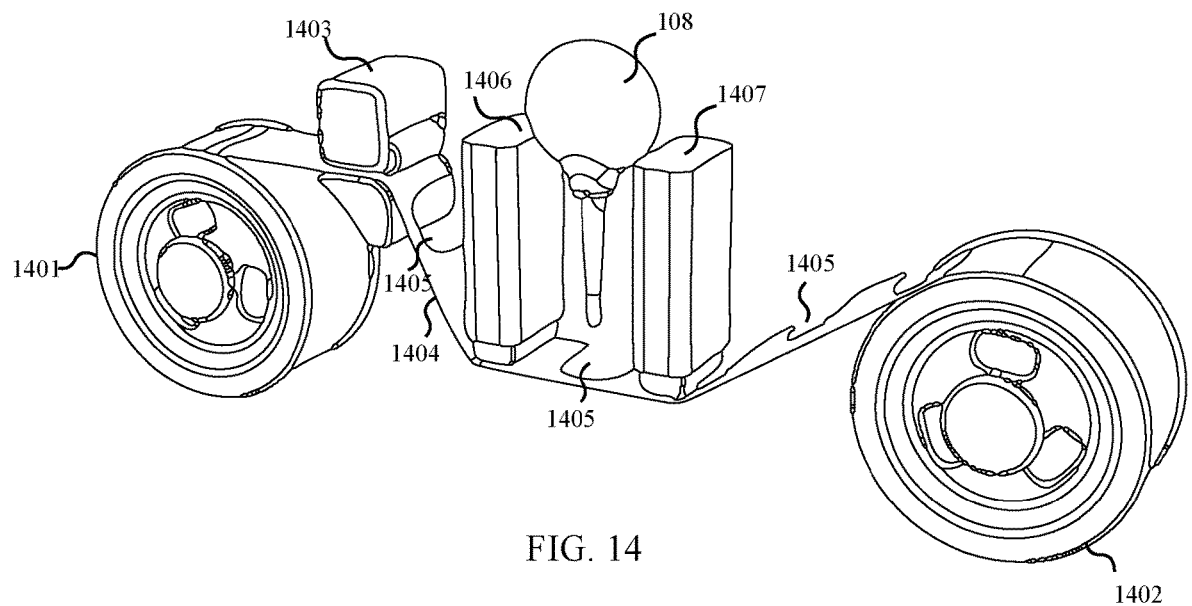
FIG. 14 illustrates an example masking apparatus.

FIG. 14 depicts a masking apparatus that can cut masks 1405 which can prevent coating from being applied outside of the bounds of the nail or the bounds of a design. The mask 1405 may be used to form shapes and designs on the nail. In some embodiments, tape 1404 coming from a tape reel 1401 is fed through a cutter 1403 which cuts the mask 1405 to a desired shape and size, then fed under tension and stabilizing supports 1406/1407, crossing the path of the applicator 108, and to a receiving reel 1402. In some embodiments, the cutter 1403 is motorized to move perpendicular to the tape 1404's direction of travel. In some embodiments, the mask remains connected to the tape 1404, as shown in FIG. 14. Alternatively, the mask may be removed individually and placed on the finger. In some embodiments the mask 1405 uses adhesive to adhere to the surface of the skin or nail. The mask 1405 can fit the unique contours of a nail. The mask 1405 can be cut to fit a limited number of parameters to roughly fit a nail. For example, the mask can be cut according to a generic shape of a nail fitted to the unique length 303 and width 302 dimensions of the individual nail. The mask 1405 can be cut from a rolled strip of thin material 1404. The mask 1405 can hover above the finger, be mechanically applied to the finger, or the user can be required to place the mask 1405 themselves. In some embodiments, the masks 1405 are precut and the cutter 1403 is not required.

Figure 15:
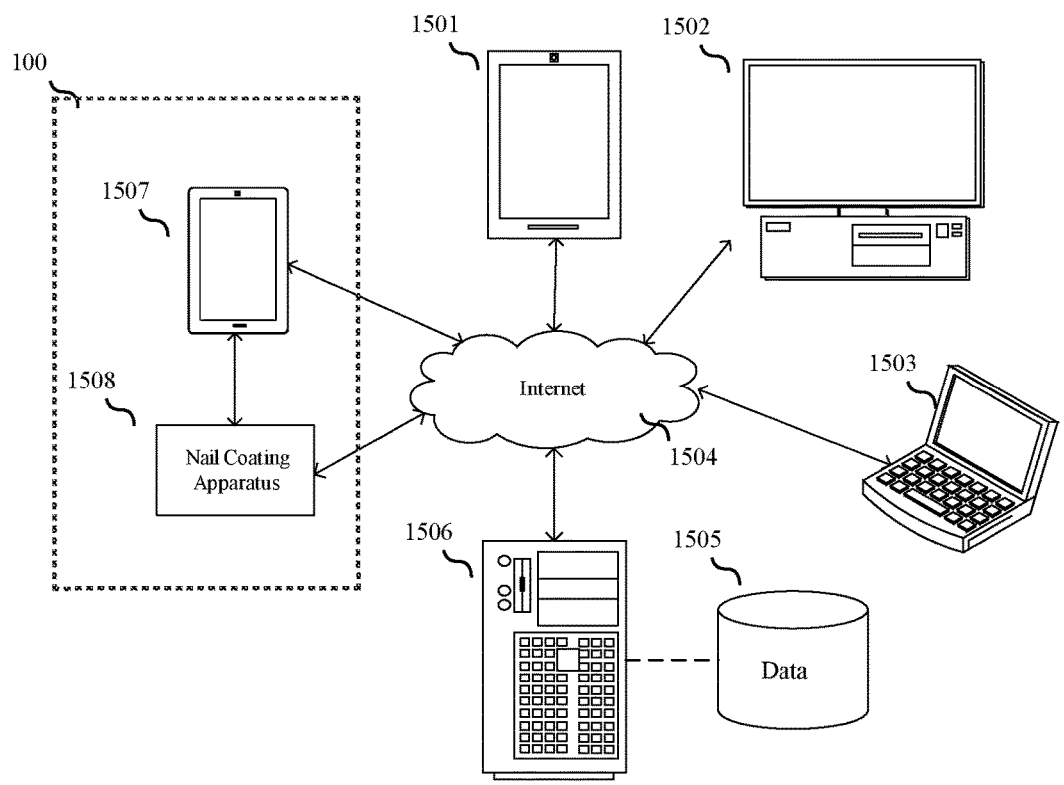
FIG. 15 illustrates an example network environment in which aspects of the various embodiments can be implemented.

FIG. 15 depicts a system map of device interconnectivity using the internet 1504. Although the internet 1504 is shown, it should be understood that any medium or topology to connect devices known in the art can be used. This example system contains a nail coating apparatus 1508, cell phone 1507, tablet computer 1501, desktop computer 1502, laptop computer 1503, and a server 1506 containing a database with data 1505. In this example system, the nail coating system 100 comprises the nail coating apparatus 1508 and cell phone 1507. The nail coating apparatus 1508 can connect to the server 1506 directly through the internet 1504, by means of a device such as a cellular phone 1507, or not have a connection to the server 1506.

In some embodiments, the server 1506 hosts a social network or platform whereby users can share and download nail designs. Users can share nail coating formulas, wherein the formulas comprise instructions for combining and sequencing various coatings. The formulas can also comprise timing information indicating a delay between coats or a length of time a coat should cure. The camera 106 can be used to capture an image of a coated nail to be presented along with the formula on the server 1506. Users can use the platform to share content from the system 100. The server 1506 can be a part of a social networking platform for users to share and collaborate. Users can access the platform to purchase and sell designs and formulas. In some embodiments, third party applications can interact with the nail coating system 100 through an API. The server 1506 can send instructions to the system 100.

In some embodiments, the camera 106 can capture an image of a nail. The system 100 can then attempt to duplicate the color and/or design onto the user's other nails. A system thus configured can enable a user to paint one nail manually and then use the system 100 to copy the color and/or design to the other nails.

In some embodiments, a platform can be hosted on the server 1506. In some embodiments, the platform can be run locally on the portable electronic device 113. A portable electronic device 113 can download an app and then prompt a user to input contact information for registration with the app. The server 1506 can maintain a database 1505 of user avatars, images, movement screens, designs, patterns, logos, animations, text, fonts, and other data that can provide or enhance functionality herein disclosed.

In some embodiments, the gallery can be categorized based on various features including objects depicted, literal interpretation, secondary objects depicted, words used, feelings or phrases commonly associated with the art, the art's owner, or geography of origin of art.

In some embodiments, the server 1506 can record rankings users place on art. The platform can be configured to accept a gesture such as a swipe, tap, click, zig-zag, etc. signifying approval, indifference, disapproval, and/or tiered rankings.

The platform can be configured to allow users to share art, portions of art, and/or galleries of art with other users within the platform and/or third-party networks. The platform can suggest categories, tags, and classifications for the sharing of posts, tweets, pins, blogs, and other content on platforms.

The platform can be configured to allow users to modify and/or combine art. In some embodiments, the user can be provided with a prefilled gallery of art from various sources, including user's device, the platform, third-party platforms, and the system 100. For example, the gallery can include photos pulled from the user's portable electronic device 113. The platform can then be configured to crop, adjust lighting settings, add colors/designs/text/images, rotate designs, scale designs, and add 3D and 2D animations to designs. The platform can also permit mixing multiple items to create new designs. In some embodiments, the platform can split an image into multiple pieces having a jigsaw puzzle shape. The platform can be configured to allow users, during the creation process, to post their draft image in order to receive feedback from other users through ranking, votes, polls, etc.

The platform can facilitate collaborative creation between multiple users. This collaborative creation can either be simultaneous or asynchronous.

The platform can detect and infringement of copyrighted material before, during, or after it is created and saved to a gallery. The platform can also detect unlicensed brand and affiliate partner logos.

The platform can categorize and classify users' created, edited, uploaded, and mixed art. The platform can log data including primary objects included in art, literal interpretation of art, secondary objects in art, words used in art, feelings/phrases commonly interpreted by the work of art, the art's owner, geography of origin of art, popularity of artist and/or of similar art.

The platform can import images, friends, logos, preferences, and tags from third-party apps as well as the portable electronic device 113's camera roll. The platform can store art on the cloud, locally on the app, locally on the portable electronic device 113, or locally on the system 100.

The platform can provide the user with the option to provide feedback, comments, or help on any functionality of the app or printing process. This option can be a button, sound, shape, logo, image, or other icon on the screen. Feedback can be shared through the platform and/or separately to the app host.

The platform can be store user profiles. The profiles can include data pertaining to the user's age, race, geography, portable interests, cultural interests, art interests, and/or fashion interests. The profile can include photographs, avatars, art, movement screens, audio, 3D animations and/or any other presentable media. The platform can allow users to upload data to their profile or select preconfigured art, avatars, etc.

The user profile can contain usage information from individual users. Usage information can include color/art preferences, a log of media consumption while using the platform, a log of coating reservoir 105s used with the system 100, and any other data that may be useful in describing the user's preferences or characteristics. The platform can utilize the information contained within the user profile to make suggestions and present targeted advertisements to the user. This functionality is especially useful when applied to the advertisement, sale, and use of consumables related to the system 100. For example, the platform could track purchasing habits and timely suggest to the user that he or she purchase a replacement coating reservoir before the one in use is depleted.

The platform can maintain a database of "points" for each user. These points can have value. The platform can increase or decrease a user's points based on various events. For example, the platform can award points to a user for uploading, combining, and sharing art, while the platform can penalize a user by removing points if a user uploads unacceptable, copyrighted, and fraudulent art. Points can be hidden from users or publicly displayed. Points can be awarded/removed for activities that take place on third-party platforms. The platform can facilitate the exchange of points between users. Users can use their points to purchase art gallery streams, downloads, and prints. The platform can maintain multiple categories of points independently. For example, there can be points for platform engagement, community participation, and purchasing product. A user can have platform engagement points, community participation points, purchasing product points, etc. kept as distinct accounts.

The platform can connect multiple users to form "nail parties" where the connected users can share their screen as well as audio and video from their devices to the other users. In some embodiments, one user hosts the session and the other users connect to the host to view the host's screen as well as receive audio and video streams. The platform can maintain a calendar of planned nail parties as well as invited guests. The nail parties can have a theme. The platform can distribute points to the host and guests for various levels of participation in a nail party. A host can livestream their session to any number of known or anonymous users.

The platform can have an API through which third-party applications can connect to some or all of the functionality of the platform.

In some embodiments, the platform is connected with physical nail salons. In some embodiments, the platform can suggest supplementary care specific to the user's preferences; for example, the platform can determine that the nail may need professional maintenance after a determined number of coatings with the system 100, or the platform can suggest a salon to perform additional filing, cutting, pushing cuticles back, etc. In some embodiments, a salon can record the service provided to a customer (e.g., a French manicure) in the customer's user profile, thus enabling the platform to suggest a home maintenance schedule using the system. In some embodiments, the platform can communicate with the third-party system of a nail salon for booking, scheduling, advertising, etc. purposes.

The component registration system described herein can be used to track and record usage of parts of the system 100. For example, applicator 108, camera 106, motor assembly 109, etc. While registering an item, the system can determine the purchasing location, time of purchase, and the origin of the item. Such information can be used for targeted advertisements. Alternatively, such information can be transmitted to an external server so that the server can learn usage habits of users.

Figure 16:
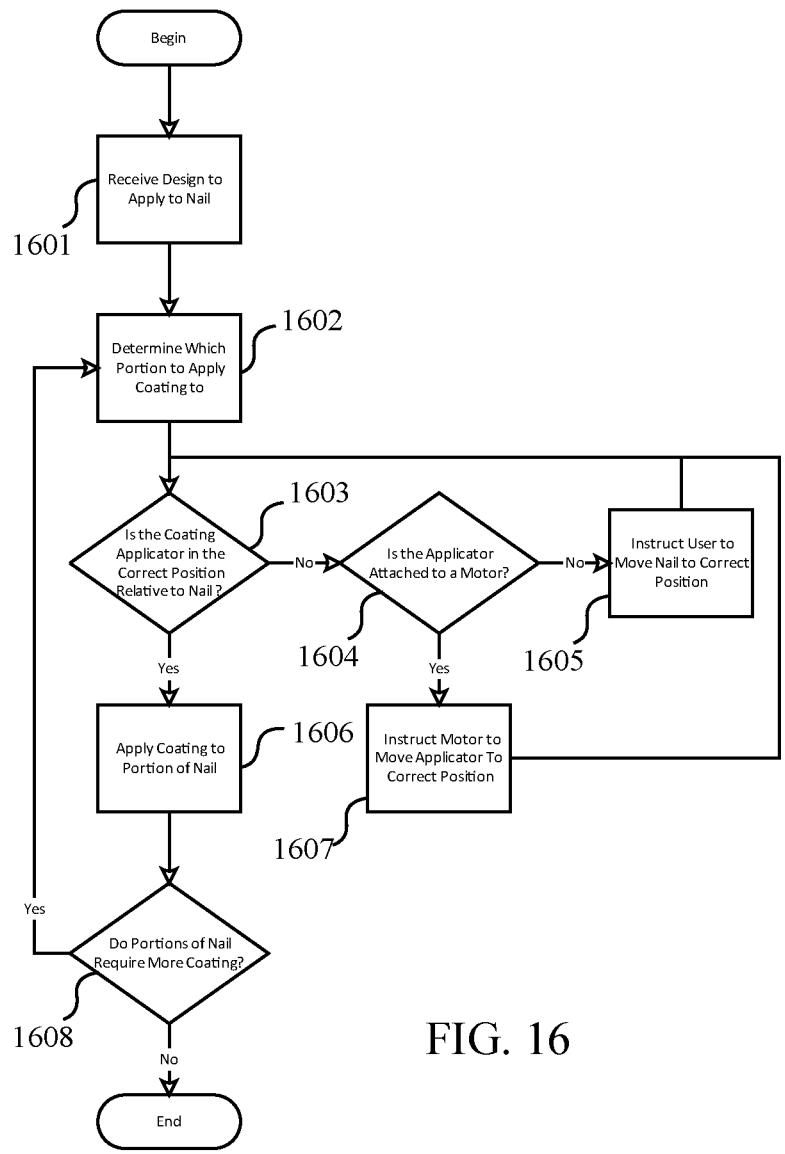
FIG. 16 illustrates a method for applying coating to a surface of a nail.

FIG. 16 depicts a method for applying a complete coating to the surface of a nail. Software, after initialization, receives a design to apply to the nail 1601. Because the applicator 108 might not be able to apply full coverage to the nail at one time, the software can determine which portion of the nail to coat first 1602. This determination can be made by analyzing a captured image from the camera and starting on an edge of the nail. The determination can also be made by calculating an optimal path or set of paths to create efficient coverage of the nail. The determination can be dictated by a set of instructions on the system 100.

The software then determines the relative position of the applicator 108 to the nail and determines if the applicator 108 is in the correct position (1603). It can use the touch surface 112 or the camera 106 to accomplish this determination. If the nail or applicator is not in the correct position, and the applicator 108 is attached to a motor assembly (1604), the software can instruct motor(s) to move the applicator 108 to the correct position (1607). If the applicator 108 is not attached to a motor, the software can instruct the user to move the nail to the correct position (1605). After providing the move instruction, the software can determine if the applicator 108 is now in the correct position (1603).

When the software determines that the nail is in the correct position, an instruction is given to the applicator 108 to apply a coating to that portion of the nail (1606). After the coating has been applied, the apparatus can determine if more coating is required (1608). This determination 1608 can be made optically with the camera 106, with user input, or an open-loop control sequence. If more coating is required, the software can determine a new location to apply coating (1603), otherwise the process is complete. In some embodiments, the software can be configured to apply multiple coatings of the same or different coating.

Figure 17A:
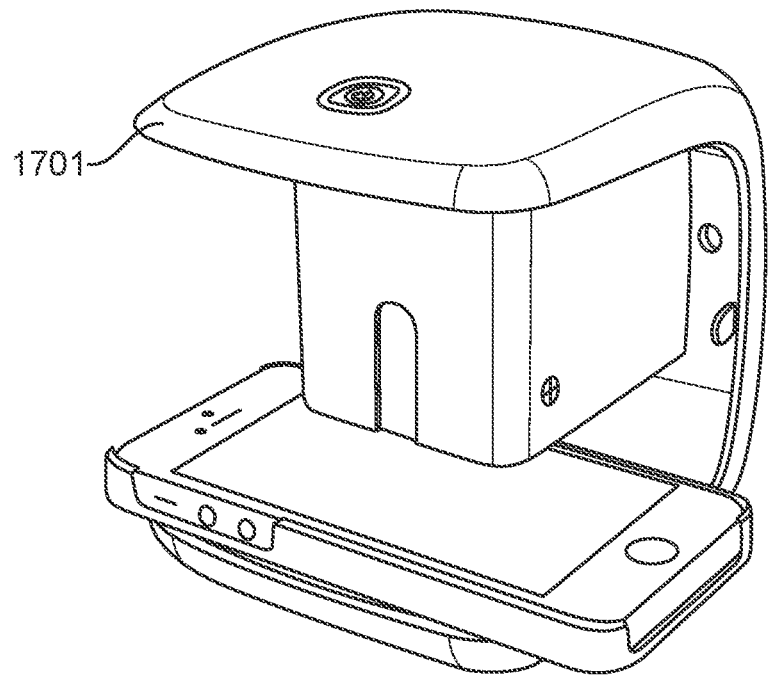
FIGS. 17A and 17B depict an example system with a covering.
Figure 17B:
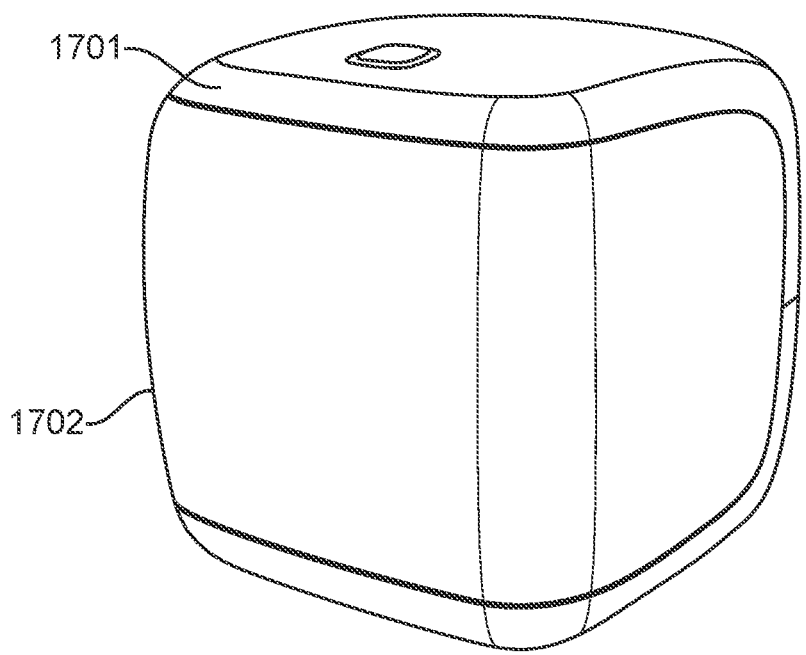

FIGS. 17A and 17B depict an example system 100 where a covering 1702 can protect the contents of the main portion 1701 when not in use.

Figure 18A:
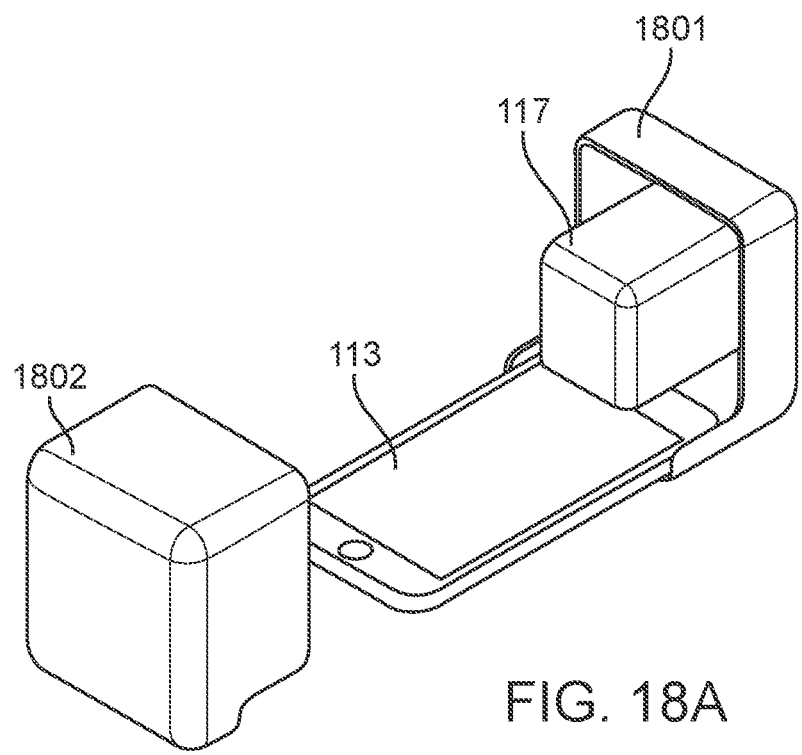
FIGS. 18A, 18B, and 18C depict an example system where two portions can connect together for protection and storage when not being used.
Figure 18B:
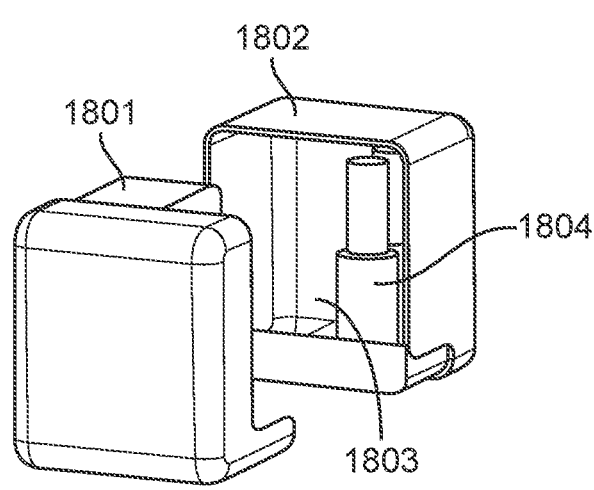
Figure 18C:
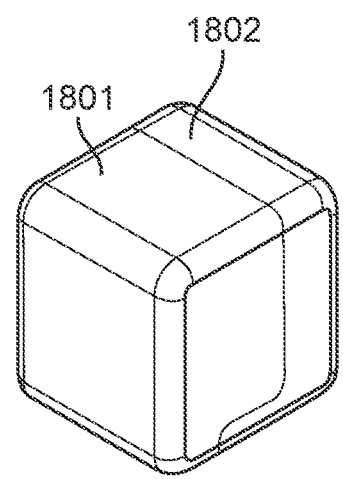

FIGS. 18A, 18B, and 18C depict another example system 100 where two portions 1801 and 1802 can connect together for protection and storage when not being used. In this example embodiment, one portion 1801 houses an applicator assembly 117 and can stabilize the portable electronic device 113. The other portion 1802 can have compartments 1803 for storing items such as nail polish 1804, nail file, cuticle pushers, and other items associated with doing one's nails.

In some embodiments, as shown in FIGS. 17B and 18C, portions of the system 100 can connect to form a cuboid. This can protect the internal components while resulting in a small and portable form factor.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A nail decorating system comprising:
   an imaging system for acquiring an image of a nail to be decorated;
   a display configured to display the image of the nail;
   an applicator which applies a coating onto the nail;
   a processor operatively coupled to the imaging system, the display, and the applicator;
   wherein the processor is configured to determine a path along which the nail is to be moved relative to the applicator.

2. The nail decorating system of claim 1, wherein the applicator comprises one or more of, a tip that can impart coating on the surface of the nail when the tip touches the nail and a nozzle that can impart coating on the surface of the nail without requiring the tip to touch the nail.

3. The nail decorating system of claim 1, wherein the applicator comprises a fitting configured to receive a removable tip or is removably coupled to a coating reservoir that is removable;
   wherein:
      the applicator is connected to the coating reservoir;
      the applicator and the coating reservoir are removable from the nail decorating system.

4. The nail decorating system of claim 1, wherein the processor is configured to further perform, one or more of:
   (i) depict a representation of the path on the display;
   (ii) instruct a user to practice the ni-ravel path without having the applicator apply a coating onto the nail;
   (iii) apply the coating onto the nail.

5. The nail decorating system of claim 1, wherein the processor is configured to detect that the user has a determined level of accuracy with respect to the path.

6. The nail decorating system of claim 1, further comprising:
   one or more motors couple to the applicator, wherein the processor is configured to control any of the one or more motor to move the applicator.

7. The nail decorating system of claim 1, wherein the processor is configured to perform one or more of: detect the path of the nail relative to the applicator and record data of the path in memory of the nail decorating system.

8. The nail decorating system of claim 1, further comprising, one or more of:
(i) a motor coupled to the applicator;
wherein the motor is configured to move the applicator linearly or to rotate the applicator about an axis;
(ii) a mirror arranged in a field of view of the imaging system;
(iii) a dryer mechanism.

9. The nail decorating system of claim 1 further comprising:
a portable electronic device, wherein one or more of, the display, the imaging system and the processor are integrated with the portable electronic device.

10. The nail decorating system of claim 1, further comprising:
a portable electronic device, wherein the portable electronic device is physically contained in the nail decorating system; wherein the portable electronic device is configurable to depict a preview of the nail decorated by the nail decorating system.

11. The nail decorating system of claim 1, further comprising:
a touch sensitive surface configured to detect presence of a digit;
wherein, the imaging system is configured to record an image of the digit substantially in a field of view of the imaging system, responsive to detection of the presence of the digit by the touch sensitive surface;
wherein, the processor is configured execute a set of instructions, the set of instructions, which when executed by the processor, causes the system to:
analyze the image of the digit,
perform a machine vision technique to determine a boundary of a nail on the digit.

12. The nail decorating system of claim 11 further comprising:
a coating applicator configured to dispense a coating onto the nail in response to the processor determining that the coating applicator is in position, relative to the nail, to apply a coating;
a motor configured to:
move or manipulate the coating applicator into position, relative to the nail;
move the imaging system into position, relative to the digit to bring the digit into the field of view; wherein, the motor is controlled by the processor.

13. The system of claim 11, wherein the touch sensitive surface detects a position of the digit on the touch sensitive surface, and communicates the position of the digit to the processor;
wherein the position is determined as it moves over time, and is periodically or continuously communicated to the processor;
wherein the touch sensitive surface has a background perceivable by the imaging system, wherein the background is usable to determine the boundary of a nail on the digit.

14. The system of claim 11, further comprising:
a portable electronic device, wherein the touch sensitive surface, the imaging system, and the processor are components of the portable electronic device;
wherein the touch sensitive surface includes a touch screen display.

15. The system of claim 11, wherein, an instruction is provided to a user, the instruction helping guide the user in moving the digit along a travel path.

16. A method comprising:
receiving from an imaging device an image of a nail;
performing digital image processing on the image to locate a boundary of the nail;
determining a travel path for moving the nail into an application zone of an applicator to coat the nail;
dispensing, via the applicator a coating onto the nail.

17. The method of claim 16, further comprising, performing one or more or of:
(i) displaying the travel path on a display;
(ii) detecting the location of the nail by sensing a location of a digit using a touch sensitive surface to which the nail is affixed;
(iii) determining, using the located boundary of the nail, an efficient dispensing procedure for the applicator to follow to coat the nail; wherein the efficient dispensing procedure includes identifying an efficient path.

18. A nail decorating system comprising:
an imaging system for acquiring an image of a nail to be decorated;
a display configured to display the image of the nail;
an applicator which applies a coating onto the nail;
a processor operatively coupled to the imaging system, the display, and the applicator;
wherein the nail decorating system is connected to a network and the processor is configured to perform one or more of:
detect a nail travel path of the nail relative to the applicator;
send data representing the nail travel path over the network;
receive, through the network, a nail travel path for which the nail should be moved relative to the applicator.

19. A nail decorating system comprising:
an imaging system for acquiring an image of a nail to be decorated;
a display configured to display the image of the nail;
an applicator which applies a coating onto the nail;
a processor operatively coupled to the imaging system, the display, and the applicator;
threaded shafts connected to one or more motors;
a pliable section with opening for the threaded shafts such that rotation of one of the threaded shafts moves a corresponding portion of the pliable section along the one of the threaded shaft;
wherein the pliable section's openings are formed to receive threaded nuts that can receive the threaded shafts;
wherein the nuts can rotate about axes perpendicular to the threaded shafts.

20. A nail decorating system comprising:
an imaging system for acquiring an image of a nail to be decorated;
a display configured to display the image of the nail;
an applicator which applies a coating onto the nail;
a processor operatively coupled to the imaging system, the display, and the applicator;
a touch sensitive surface configured to detect presence of a digit;
wherein, the imaging system is configured to record an image of the digit substantially in a field of view of the imaging system, responsive to detection of the presence of the digit by the touch sensitive surface;

wherein, the processor is configured execute a set of instructions, the set of instructions, which when executed by the processor, causes the system to:

analyze the image of the digit, perform a machine vision technique to determine a boundary of the nail on the digit;

wherein the touch sensitive surface detects a position of the digit on the touch sensitive surface, and communicates the position of the digit to the processor;

wherein the position is determined as the digit moves over time, and is periodically or continuously communicated to the processor;

wherein the touch sensitive surface has a background perceivable by the imaging system, wherein the background is usable to determine the boundary of the nail on the digit.

21. A nail decorating system comprising:

an imaging system for acquiring an image of a nail to be decorated;

a display configured to display the image of the nail;

an applicator which applies a coating onto the nail;

a processor operatively coupled to the imaging system, the display, and the applicator;

a touch sensitive surface configured to detect presence of a digit;

wherein, the imaging system is configured to record an image of the digit substantially in a field of view of the imaging system, responsive to detection of the presence of the digit by the touch sensitive surface;

wherein, the processor is configured execute a set of instructions, the set of instructions, which when executed by the processor, causes the system to:

analyze the image of the digit, perform a machine vision technique to determine a boundary of the nail on the digit;

a portable electronic device, wherein the touch sensitive surface, the imaging system, and the processor are components of the portable electronic device;

wherein the touch sensitive surface includes a touch screen display;

wherein, the system provides an instruction to a user, the instruction helping guide the user in moving the digit along a travel path.

* * * * *